United States Patent
Baek et al.

(10) Patent No.: US 10,917,835 B2
(45) Date of Patent: Feb. 9, 2021

(54) APPARATUS AND METHOD FOR V2X COMMUNICATION

(71) Applicant: LG Electronics Inc., Seoul (KR)

(72) Inventors: Jongseob Baek, Seoul (KR); Woosuk Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/469,958

(22) PCT Filed: Dec. 14, 2016

(86) PCT No.: PCT/KR2016/014629
§ 371 (c)(1),
(2) Date: Jun. 14, 2019

(87) PCT Pub. No.: WO2018/110729
PCT Pub. Date: Jun. 21, 2018

(65) Prior Publication Data
US 2020/0092796 A1    Mar. 19, 2020

(51) Int. Cl.
*H04W 4/40* (2018.01)
*H04W 48/12* (2009.01)
*H04W 4/46* (2018.01)
*H04W 76/40* (2018.01)
(Continued)

(52) U.S. Cl.
CPC ............ *H04W 48/12* (2013.01); *H04L 67/12* (2013.01); *H04W 4/46* (2018.02); *H04W 72/0453* (2013.01); *H04W 76/40* (2018.02)

(58) Field of Classification Search
None
See application file for complete search history.

(56) References Cited

U.S. PATENT DOCUMENTS

| | | |
|---|---|---|
| 2011/0128849 A1 | 6/2011 | Guo |
| 2011/0141970 A1 | 6/2011 | Juan et al. |
| 2011/0294424 A1 | 12/2011 | Hu et al. |

(Continued)

FOREIGN PATENT DOCUMENTS

| | | |
|---|---|---|
| CN | 102724764 | 11/2014 |
| KR | 20110107908 | 10/2011 |

(Continued)

OTHER PUBLICATIONS

Akbarifar et al., "An Extension to IEEE 1609.4 for Dynamic Multichannel Interval Adjustment in WAVE Architecture," International eConference on Computer and Knowledge Engineering, XP32293058, Oct. 2012, 6 pages.

(Continued)

*Primary Examiner* — Ayanah S George
(74) *Attorney, Agent, or Firm* — Fish & Richardson P.C.

(57) ABSTRACT

Disclosed is a multi-channel operation method of a V2X communication device. The multi-channel operation method according to an embodiment of the present invention includes accessing a control channel (CCH) for a service advertisement information exchange, receiving the service advertisement information via the accessed control channel, accessing a service channel (SCH) for the transmission or reception of service data for service provision based on the service advertisement information, and receiving the service data via the service channel.

6 Claims, 20 Drawing Sheets

(51) Int. Cl.
*H04L 29/08* (2006.01)
*H04W 72/04* (2009.01)

(56) References Cited

U.S. PATENT DOCUMENTS

| | | | |
|---|---|---|---|
| 2011/0306353 A1 | 12/2011 | Kim et al. | |
| 2012/0028675 A1* | 2/2012 | Lee | H04W 36/00 455/525 |
| 2012/0087292 A1 | 4/2012 | Grimm et al. | |
| 2012/0093091 A1 | 4/2012 | Kang et al. | |
| 2012/0188964 A1 | 7/2012 | Zhang et al. | |
| 2015/0195827 A1 | 7/2015 | Feng et al. | |
| 2015/0305038 A1 | 10/2015 | Du et al. | |
| 2016/0112856 A1* | 4/2016 | Han | H04L 67/12 455/404.1 |

FOREIGN PATENT DOCUMENTS

| | | |
|---|---|---|
| KR | 1020120012849 | 2/2012 |
| KR | 101603436 | 3/2016 |
| WO | WO2009069047 | 6/2009 |

OTHER PUBLICATIONS

Biddlestone et al., "A GNU Radio Based Testbed Implementation with IEEE 1609 WAVE Functionality," IEEE Vehicular Networking Conference, XP31630272, Oct. 2009, 7 pages.

Chen et al., "A Group Bandwidth Reservation Scheme for the Control Channel in IEEE 802.11p/1609 Networks," International Conference on Wireless Algorithms, Systems, and Applications, XP47317330, Aug. 2015, 10 pages.

EP Search Report in European Application No. 16923748.4, dated Jul. 13, 2020, 75 pages.

IEEE Vehicular Technology Society, "IEEE Standard for Wireless Access in Vehicular Environments (WAVE)Networking Services," Intelligent Transportation Systems Committee, XP68166714, Dec. 2010, 212 pages.

Intelligent Transportation Systems Committee, "IEEE Trial-Use Standard for Wireless Access in Vehicular Environments-Security Services for Applications and Management Messages," IEEE Vehicular Technology Society, XP68150201, Jul. 2006, 117 pages.

Lee et al., "An efficient SCH utilization scheme for IEEE 1609 .4 multi-channel environments in VANETs," IEEE International Conference on Communications, XP32922261, Jul. 2016, 6 pages.

Wang et al., "An Enhanced Multi-channel MAC for the IEEE 1609 .4 based Vehicular Ad Hoc Networks," IEEE Conference on Computer Communications Workshops, XP31677449, Apr. 2010, 2 pages.

Wang et al., "Improving the Channel Utilization of IEEE 802.11p/1609 Networks," IEEE Wireless Communications and Networking Conference, XP3145247, 2009, 6 pages.

Wang et al., "On Multi-hop Forwarding over WBSS-based IEEE 802.11(p)/1609 Networks," IEEE 20th International Symposium on Personal, Indoor and Mobile Radio Communications, XP31659954, Sep. 2009, 5 pages.

Yoo et al., "Dynamic Channel Coordination Schemes for IEEE 802.11p/1609 Vehicular Networks: A Survey," International Journal of Distributed Sensor Networks, XP55710392, Oct. 2013, 8 pages.

* cited by examiner (a)

| Bits | Usage | Safety interval | Non-safety interval |
|---|---|---|---|
| 0000 | only safety | 1 | 0 |
| 0001 | only non-safety | 0 | 1 |
| 0010 | safety=non-safety | 1 | 1 |
| 0011 | safety>non-safety | 2 | 1 |
| 0100 | safety>non-safety | 3 | 1 |
| 0101 | safety>non-safety | 4 | 1 |
| 0110 | safety<non-safety | 1 | 2 |
| 0111 | safety<non-safety | 1 | 3 |
| 1000 | safety<non-safety | 1 | 4 |
| reserved bit | | | |

| Name | Type | Valid range |
|---|---|---|
| Channel Identifier | IEEE std 802.11 | IEEE std 802.11 |
| Time Slot | IEEE std 802.11 | IEEE std 802.11 |
| OperationalRateSet | IEEE std 802.11 | IEEE std 802.11 |
| EDCA Parameter Set | IEEE std 802.11 | IEEE std 802.11 |
| Immediate Access | Integer | 0-255 |
| Enhanced Mode Access | Integer | 0-2 |
| Time Interval Value | Integer | 0-15 |

APPARATUS AND METHOD FOR V2X
COMMUNICATION

CROSS-REFERENCE TO RELATED APPLICATIONS

This application is a National Stage application under 35 U.S.C. § 371 of International Application No. PCT/KR2016/014629, filed on Dec. 14, 2016, the disclosure of which is incorporated herein by reference in its entirety.

TECHNICAL FIELD

The present invention relates to a device and method for V2X communication, and more particularly, to a multi-channel access method, a multi-channel operation method, and a time interval configuring method when accessing to multi-channels for V2X communication.

BACKGROUND ART

Nowadays, vehicles are becoming from a product of Mechanical Engineering to a product of complex industrial technology in which electrical technology, electronic technology, and communication technology are fused and in this regard, the vehicle is called a smart car. The smart car connects a driver, a vehicle, and a traffic infrastructure to provide various user customized mobile services as well as traditional vehicle technology, such as traffic safety/jam solution. Such connectivity may be implemented using vehicle to everything (V2X) communication technology.

DISCLOSURE

Technical Problem

Various services may be provided through V2X communication. Furthermore, a plurality of frequency bands has become used to provide various services. In such an environment, in terms of vehicle communication, high reliable forwarding and provision of safety services is a very important problem. Particularly, there is a need for the configuration and allocation of a flexible and efficient time interval for a multi-channel operation.

Technical Solution

A multi-channel operation method of a V2X communication device according to an embodiment of the present invention includes accessing a control channel (CCH) for a service advertisement information exchange, receiving the service advertisement information via the accessed control channel, accessing a service channel (SCH) for the transmission or reception of service data for service provision based on the service advertisement information, and receiving the service data via the service channel. The control channel access and the service channel access may operate based on a channel coordination mode. The control channel access and the service channel access may be performed based on a sync interval, and the sync interval comprises a first time unit and a second time unit.

In the multi-channel operation method according to an embodiment of the present invention, the first time unit may be a CCH interval for the control channel access, and the second time unit may be an SCH interval for the service channel access.

In the multi-channel operation method according to an embodiment of the present invention, when the channel coordination mode is an enhanced mode, the control channel access and the service advertisement information reception may be performed via the control channel during at least one time unit among the first time unit or second time unit of a first sync interval.

In the multi-channel operation method according to an embodiment of the present invention, when the channel coordination mode is the enhanced mode, the service channel access and the service data reception may be performed via the service channel during a second sync interval subsequent to the first sync interval.

In the multi-channel operation method according to an embodiment of the present invention, when the channel coordination mode is the enhanced mode, the service channel access and the service data reception may be performed via the service channel during at least one time unit among the third time unit or fourth time unit of the second sync interval.

In the multi-channel operation method according to an embodiment of the present invention, the first sync interval may include at least one of a safety interval communicating safety-related service data or a non-safety interval communicating non-safety-related service data.

Furthermore, a V2X communication device according to an embodiment of the present invention may include a memory configured to store data, an RF unit configured to transmit and receive radio signals, and a processor configured to control the RF unit. The V2X communication device may access a control channel (CCH) for a service advertisement information exchange, may receive the service advertisement information via the accessed control channel, may access a service channel (SCH) for the transmission or reception of service data for service provision based on the service advertisement information, and may receive the service data via the service channel. The control channel access and the service channel access may operate based on a channel coordination mode. The control channel access and the service channel access may be performed based on a sync interval, and the sync interval may include a first time unit and a second time unit.

Advantageous Effects

According to the present invention, contention and forward latency of safety service of V2X communication can be minimized by adding an enhanced mode upon performing a multi-channel operation. According to the present invention, contention for communication between services can be minimized by allocating one sync interval, including a CCH interval and an SCH interval, for CCH access. Furthermore, communication contention between services can be minimized because safety-related information and service-related information are communicated in a separate time slot within a sync interval. Furthermore, a multi-channel operation method having high resource utilization efficiency can be provided by proposing an asynchronous channel access mode. Other effects of the present invention are described in the following specification.

DESCRIPTION OF DRAWINGS

The accompany drawings, which are included to provide a further understanding of the present invention and are incorporated in and constitute a part of this specification.

FIG. 18 shows parameters of MLMEX-CHSTART.request information according to an embodiment of the present invention.

BEST MODE

Preferred embodiments of the present invention will be described in detail with reference to the accompanying drawings. The following detailed description with reference to the attached drawings illustrates preferred embodiments of the present invention rather than illustrating only embodiments that may be implemented according to embodiments of the present invention. The following detailed description includes details in order to provide a thorough understanding of the present invention, but the present invention does not require all of these details. In the present invention, embodiments described hereinafter are not intended to be respectively used independently. Multiple embodiments or all embodiments may be used together, and specific embodiments may be used in combination.

Most of terms used in the present invention are selected from general ones widely used in the art, but some terms are optionally selected by an applicant and meanings thereof are described in detail in the following description as needed. Accordingly, the present invention should be understood based on the intended meaning of the term rather than a simple name or meaning of the term.

The present invention relates to a V2X communication device, and the V2X communication device may be included in an Intelligent Transport System (ITS) to perform all or some of functions of the ITS system. The V2X communication device may perform communication with a vehicle and a vehicle, a vehicle and an infrastructure, a vehicle and a bicycle, and mobile devices. The V2X communication device may be abbreviated to a V2X device. In an embodiment, the V2X device may correspond to an On Board Unit (OBU) of a vehicle or may be included in an OBU. The V2X device may correspond to a Road Side Unit (RSU) of an infrastructure or may be included in an RSU. Alternatively, the V2X communication device may correspond to an ITS station or may be included in an ITS station. In an embodiment, the V2X device may operate in a Wireless Access In Vehicular Environments (WAVE) system of IEEE 1609.1 to 4.

Figure 1:
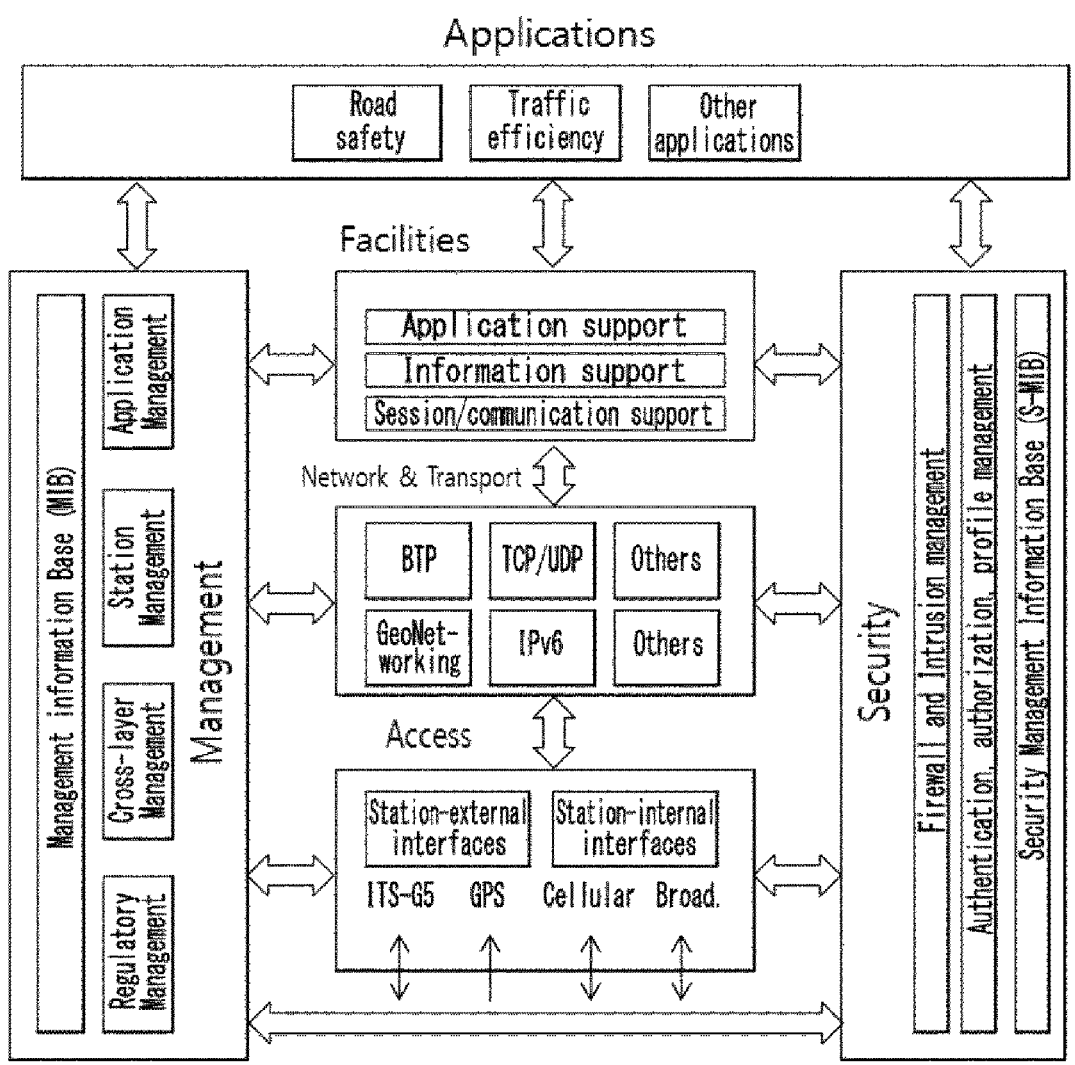
FIG. 1 illustrates a reference architecture of an Intelligent Transport System (ITS) station according to an embodiment of the present invention.

FIG. 1 illustrates a reference architecture of an Intelligent Transport System (ITS) station according to an embodiment of the present invention.

In the architecture of FIG. 1, two end vehicles/users may communicate with a communication network, and such communication may be performed through a function of each layer of the architecture of FIG. 1. For example, when a message between vehicles is communicated, in a transmitting vehicle and an ITS system thereof, by passing through each layer below one layer, data may be transferred, and in a receiving vehicle and an ITS system thereof, by passing through each layer above one layer, data may be transferred. A description of each layer of the architecture of FIG. 1 is as follows.

Application layer: the application layer may implement and support various use cases. For example, the application may provide road safety, efficient traffic information, and other application information.

Facilities layers: the facilities layer may support to effectively realize various use cases defined at the application layer. For example, the facilities layer may perform application support, information support, and session/communication support.

Networking & Transport layer: the networking/transport layer may constitute a network for vehicle communication between homogenous/heterogenous networks by using various transport protocols and network protocols. For example, the networking/transport layer may provide Internet access and routing using an Internet protocol such as TCP/UDP+IPv6. Alternatively, the networking/transport layer may constitute a vehicle network using a geographical position based protocol such as Basic Transport Protocol (BTP)/GeoNetworking.

Access layer: the access layer may transmit a message/data received from a superordinate layer through a physical channel. For example, the access layer may perform/support data communication based on IEEE 802.11 and/or 802.11p standard based communication technology, ITS-G5 wireless communication technology based on IEEE 802.11 and/or 802.11p standard physical transmission technology, 2G/3G/4G(LTE)/5G wireless cellular communication technology including satellite/broadband wireless mobile communication, broadband terrestrial digital broadcasting technology such as DVB-T/T2/ATSC, GPS technology, and IEEE 1609 WAVE technology.

ITS architecture may further include a management layer and a security layer.

Figure 2:
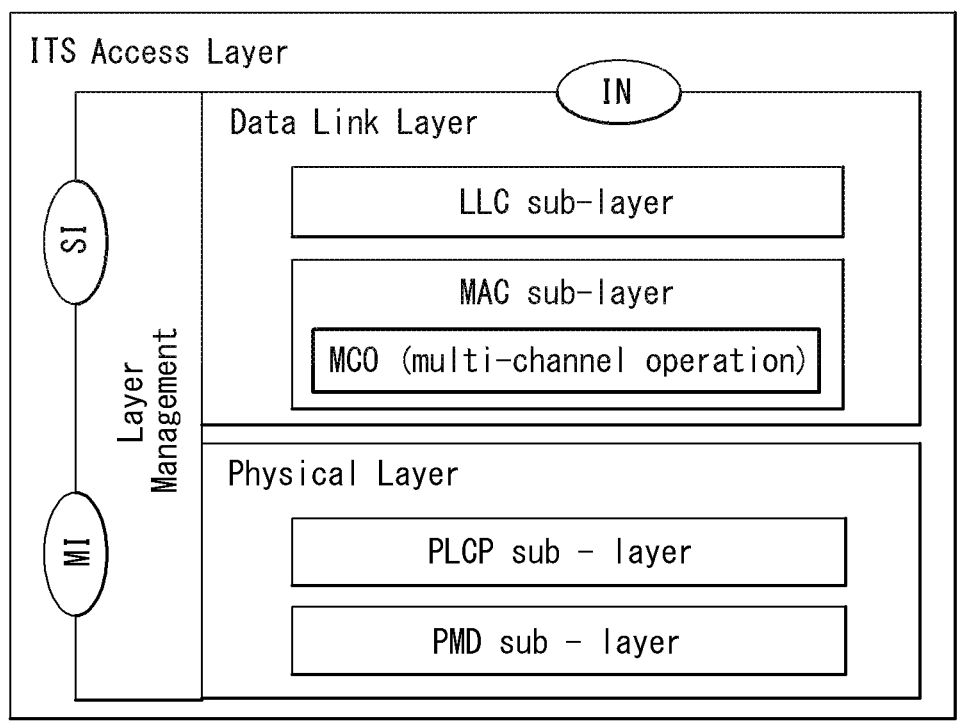
FIG. 2 illustrates an ITS access layer according to an embodiment of the present invention.

FIG. 2 illustrates an ITS access layer according to an embodiment of the present invention.

FIG. 2 illustrates in more detail the ITS Access Layer of the ITS system of FIG. 1. The access layer of FIG. 2 may include a data link layer, a physical layer, and layer management. The access layer of FIG. 2 has characteristics similar to or identical to an OSI 1 layer (physical layer) and an OSI 2 layer (data link layer).

The data link layer may include a Logical Link Control (LLC) sub-layer, a Medium Access Control (MAC) sub-layer, and a Multi-channel operation (MCO) sub-layer. The physical layer may include a Physical Layer Convergence Protocol (PLCP) sub-layer and a Physical Medium Access (PMD) sub-layer.

In order to enable a superordinate network layer to use a physical line between adjacent nodes (or between vehicles) having noise, the data link layer may convert the physical line into a communication channel having no transmission error. The data link layer performs a function of transmitting/transporting/transferring a 3-layer protocol, a framing function of dividing and grouping data to transmit into a packet (or frame) as a transmission unit, a flow control function of compensating a speed difference between the sending side and the receiving side, and a function of detecting and modifying or retransmitting a transmission error. Further, the data link layer performs a function of giving a sequence number to a packet and an ACK signal in order to avoid to erroneously confuse the packet or the ACK signal and a function of controlling setting, maintaining, short-circuit, and data transmission of a data link between network entities. Furthermore, such a data link layer may include a logical link control (LLC) sub-layer and a medium access control (MAC) sub-layer based on IEEE 802 standard.

A main function of the LLC sub-layer is to enable to use several different sub-MAC sub-layer protocols to allow communication unrelated to topology of a network.

The MAC sub-layer may control occurrence of collision/contention between vehicles when several vehicles (or nodes or a vehicle and peripheral devices) use a shared medium. The MAC sub-layer may format a packet transferred from a superordinate layer to correspond to a frame format of the physical network. The MAC sub-layer may perform addition and identification functions of a sender address/recipient address, carrier detection, collision detection, and fault detection on a physical medium.

The physical layer: the physical layer may define an interface between a node and a transmission medium to a lowest layer on an ITS layer structure and perform modulation, coding, and mapping of a transmission channel to a physical channel for bit transmission between data link layer entities. Further, the physical layer performs a function of notifying the MAC sub-layer whether a wireless medium is being used (busy or idle) through carrier sense and clear channel assessment (CCA). Furthermore, such a physical layer may include a physical layer convergence protocol (PLCP) sub-layer and a physical medium access (PMD) sub-layer based on IEEE standard.

The PLCP sub-layer performs a function of connecting a data frame with the MAC sub-layer. By attaching a header to the received data, the PLCP sub-layer enables to operate the MAC sub-layer regardless of physical characteristics. Therefore, in the PLCP frame, a format thereof may be defined differently according to various different wireless LAN physical layer standards.

A main function of the PMD sub-layer may perform carrier/RF modulation of frames received from the PLCP sub-layer and then transmit the frames to a wireless medium according to transmission and reception transmission related standards.

Layer management performs a function of managing and servicing information related to an operation and security of an access layer. Information and service are bilaterally transferred and shared through MI (interface between management entity and access layer or MI-SAP) and SI (interface between security entity and access layer or SI-SAP). Two-way information and service transfer between the access layer and a network/transport layer is performed by IN (or IN-SAP).

The MCO sub-layer may provide various services such as a safety service and other services, i.e., a non-safety service other than the safety service using a plurality of frequency channels. By effectively distributing a traffic load in a particular frequency channel to other channels, the MCO sub-layer may minimize collision/contention when communicating between vehicles in each frequency channel. The MCO sub-layer may perform multi-channel access and operation to be described hereinafter based on setting received from the superordinate layer.

Figure 3:
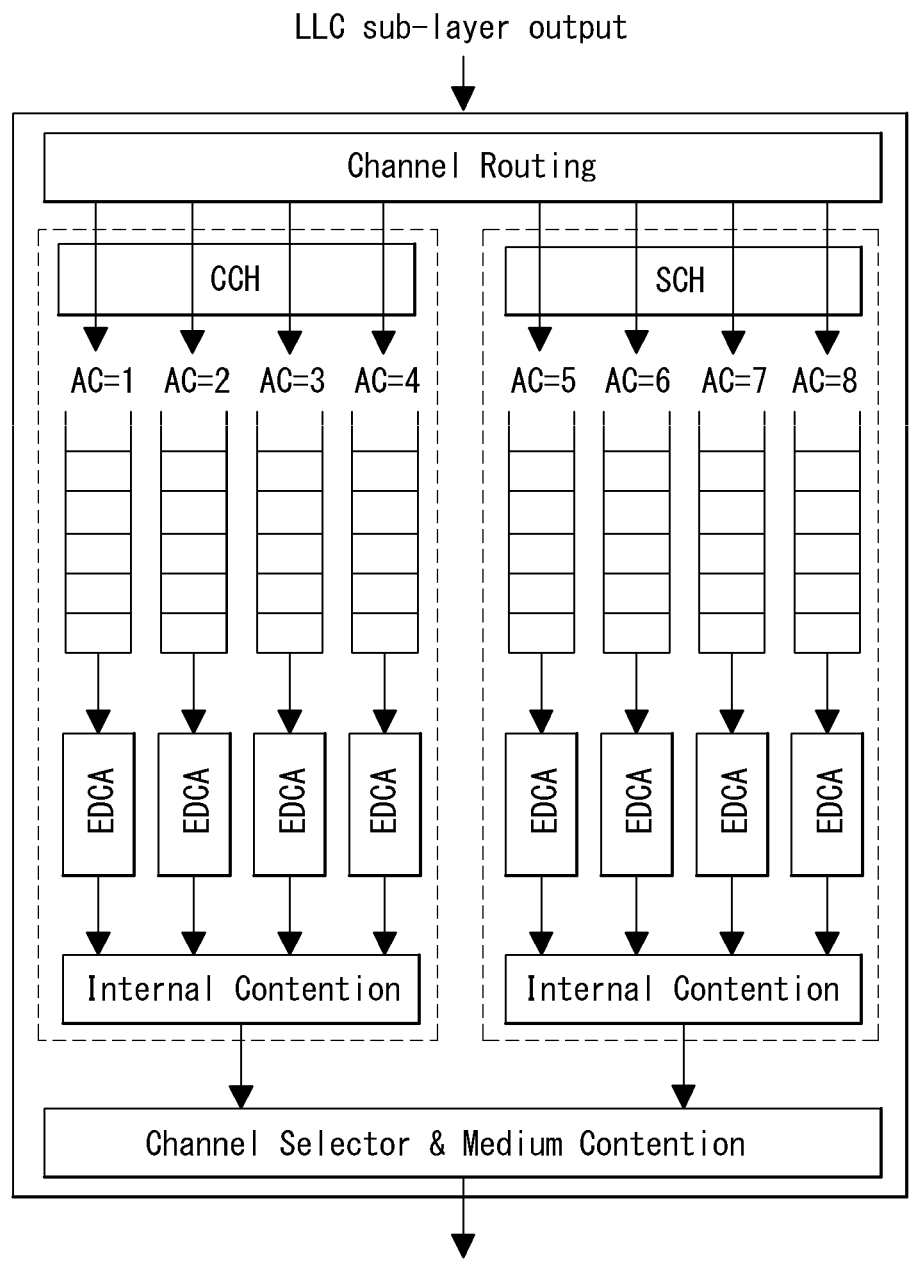
FIG. 3 illustrates a conceptual internal architecture of a MAC sub-layer that performs a multi-channel operation (MCO) according to an embodiment of the present invention.

FIG. 3 illustrates a conceptual internal architecture of a MAC sub-layer that performs a multi-channel operation (MCO) according to an embodiment of the present invention.

In an embodiment, the architecture of FIG. 3 may correspond to a MCO block of FIG. 2. An MCO structure of FIG. 3 may include channel coordination in which channel access is defined, channel routing that defines an operation process of a management frame and overall data between PHY-MAC layers, Enhanced Dedicated Channel Access (EDCA) that determines and defines a priority of a transmission frame, and a data buffer (or queue) that stores a frame received from a superordinate layer. A channel coordination block is not shown in FIG. 3, and channel coordination may be performed by an entire MAC sub-layer of FIG. 3.

Channel coordination: in an embodiment, channel access to the Control Channel (CCH) and the Service Channel (SCH) may be controlled. Channel access coordination will be described later. In an embodiment, a Wave Short Message (WSM) may be transmitted to the CCH, and the WSM and/or IP data may be transmitted to the SCH.

A data buffer (queue): The data buffer may store a data frame received from a superordinate layer according to a defined Access Category (AC). In the embodiment of FIG. 3, a data buffer may be provided for each AC.

Channel routing: the channel routing block may transfer data input from a superordinate layer to the data buffer. For a transmission request of the superordinate layer, a transmission operating parameter such as a channel number, transmission power, and a data rate for the above-described channel coordination and frame transmission may be called.

EDCA: The EDCA is a contention based medium access method of dividing traffic into four access categories (ACs) according to a type of traffic with a method of guaranteeing a QoS in an existing IEEE 802.11e MAC layer to give differentiated priorities to each category and allocating differentiated parameters for each AC to give more transmission opportunities to traffic of a high priority. For transmission of data including a priority, an EDCA block may specify 8 priorities of 0 to 7 and map data arriving at the MAC layer to four ACs according to the priority.

Figure 4:
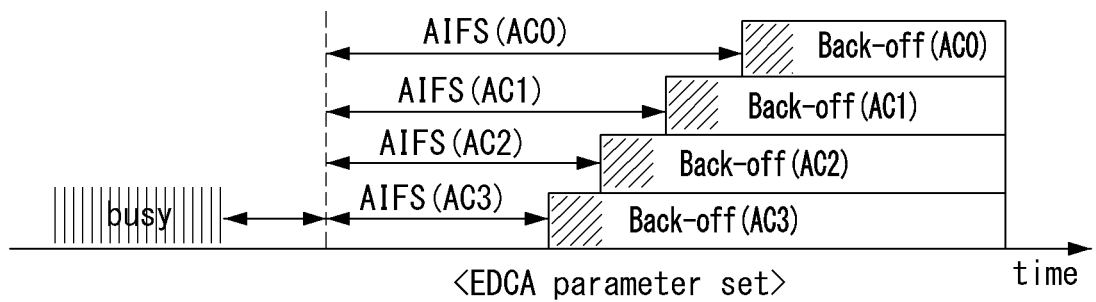
FIG. 4 illustrates the relationship between a user priority of EDCA and an Access Category (AC) according to an embodiment of the present invention.

FIG. 4 illustrates the relationship between a user priority of EDCA and an access category (AC) according to an embodiment of the present invention.

The relationship between a user priority of the EDCA and the AC is shown in FIG. 4. In FIG. 4, the higher the AC number, the higher the priority. All ACs have each transmission queue and AC parameter and a difference of priorities between ACs is determined based on differently set AC parameter values. The differently set AC parameter value is connected to back-off to have different channel access order. Each of parameter values of the corresponding AC uses AIFS[AC], CWmin[AC], and CWmax[AC], and here, an Arbitration Inter-Frame Space (AIFS) is a minimum time for determining whether a channel is idle before transmission. When AIFS[AC] and CWmin[AC] have a small value, AIFS[AC] and CWmin[AC] have a high priority and thus channel access delay is shortened and more bands may be thus used in a given traffic environment.

When a collision between stations occurs while transmitting a frame, a transmitter generates a new back-off counter. Transmission queue for four ACs defined to IEEE 802.11 MAC individually contends for wireless medium access within a single station, as shown in FIG. 4. Because each AC has an independent back-off counter, a virtual collision may occur. When there are two or more ACs in which back-off is simultaneously completed, data of an AC having a highest priority are first transmitted, and other ACs increase a CW value to again update the back-off counter. Such a collision solving process is referred to as a virtual collision process. Further, when transmitting data through the transmission opportunity (TXOP), EDCA enables access to the channel. Because one frame is too long, when one frame cannot be transmitted for TXOP of one time, the one frame may be divided into smaller frames and be transmitted.

Figure 5:
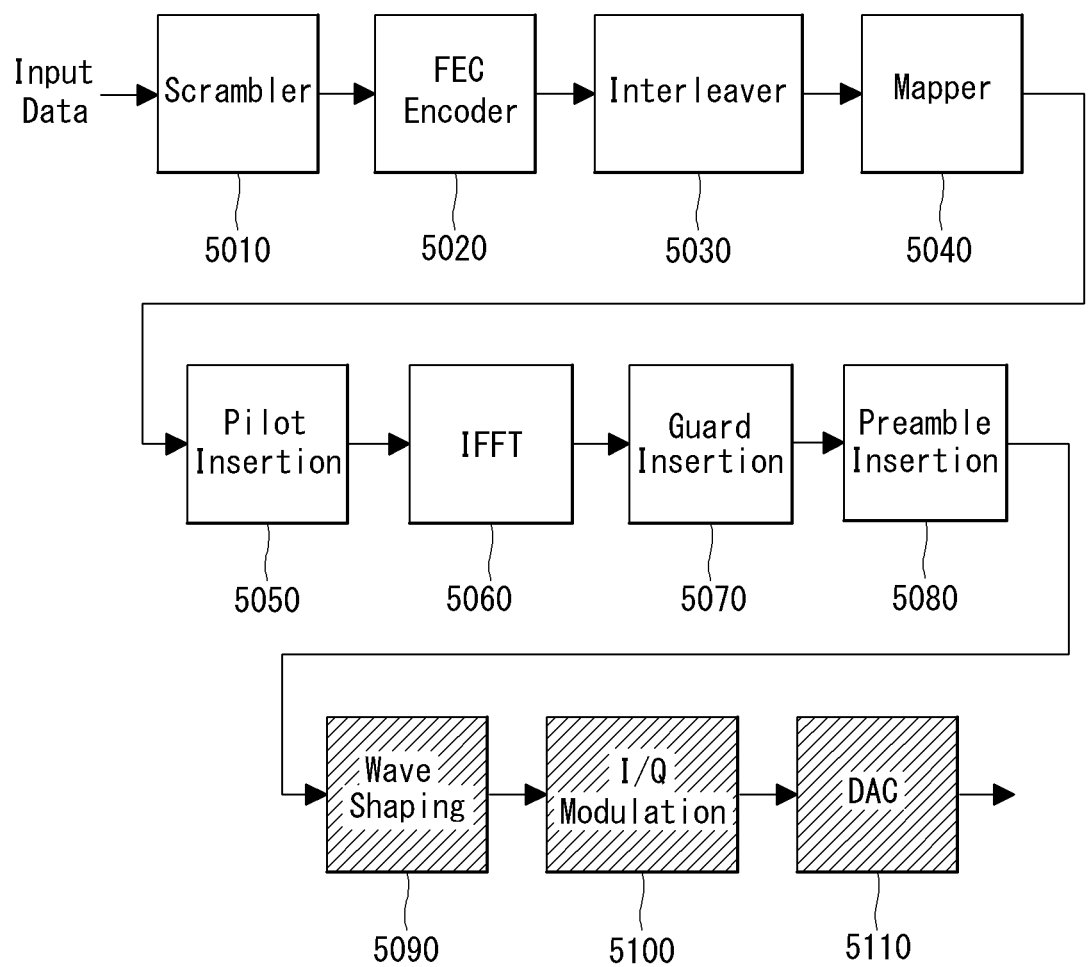
FIG. 5 illustrates a physical layer configuration of a V2X transmission device according to an embodiment of the present invention.

FIG. 5 illustrates a physical layer configuration of a V2X transmission device according to an embodiment of the present invention.

In an embodiment, FIG. 5 illustrates a physical layer signal processing block of IEEE 802.11 or ITS-G5. However, FIG. 5 illustrates a physical layer configuration according to an embodiment of the present invention and is not limited only to the above-described transmission standard technology.

A physical layer processor of FIG. 5 may include a Physical layer Convergence Protocol (PLCP) sub-layer baseband signal processing part including at least one of a scrambler 5010, an FEC encoder 5020, an interleaver 5030, a mapper 5040, a pilot insertion 5050, an IFFT 5060, a guard insertion 5070, and a preamble insertion 5080 and a physical medium dependant (PMD) sub-layer RF band signal processing part including at least one of a wave shaping 5090, an I/Q modulation 5100, and a DAC 5110. A function description of each block is as follows.

The scrambler 5010 may perform an XOR operation of input bit stream with a pseudo random binary sequence (PRBS) to randomize the input bit stream. In order for the receiving side to correct an error on a transmission channel, the FEC encoder 5020 may add redundancy to transmission data. The interleaver 5030 may interleave an input data/bit string based on an interleaving rule in order to respond to a burst error. In an embodiment, when deep fading or erasure is applied to a QAM symbol, interleaved bits are mapped to each QAM symbol and thus an error may be prevented from occurring in continued bits of entire codeword bits. The mapper 5040 may allocate an input bit word to single constellation. The pilot insertion 5050 inserts a reference signal into a predetermined position of a signal block. By using such a reference signal, the receiver may estimate a channel distortion phenomenon such as channel estimation, frequency offset, and timing offset.

In order to enhance transmission efficiency and flexibility in consideration of characteristics of the transmission channel and a system structure, the IFFT 5060, i.e., an inverse waveform transform block may convert an input signal. In an embodiment, in the case of an OFDM system, the IFFT 5060 may convert a signal of a frequency domain to a signal of a time domain using an inverse FFT operation. The IFFT 5060 may not be used or may be omitted in the case of a single carrier system. In order to minimize an influence of delay spread of the transmission channel, the guard insertion 5070 may insert a guard interval between adjacent signal blocks. In an embodiment, in the case of an OFDM system, the guard insertion 5070 may insert a click prefix into a guard interval segment. The preamble insertion 5080 may insert a predetermined type signal, i.e., a preamble into a transmission signal for a transmission and reception period so that the receiver may quickly and efficiently detect a target signal. In an embodiment, in the case of an OFDM system, the preamble insertion 5080 may define a signal block/signal frame including a plurality of OFDM symbols and insert a preamble symbol into a start portion of the signal block/signal frame.

The wave shaping 5090 may perform waveform processing of an input baseband signal based on channel transmission characteristics. In an embodiment, in order to obtain a reference of out-of-band emission of the transmission signal, the waveform shaping 5090 may perform square-root-raised cosine (SRRC) filtering. In the case of a multi-carrier system, the waveform shaping 5090 may not be used or may be omitted. The I/Q modulation 5100 may perform in-phase and quadrature modulation. The Digital to Analog Converter (DAC) 5110 may convert and output an input digital signal to an analog signal. An output analog signal may be transmitted through an output antenna.

Each of the blocks illustrated and described in FIG. 5 may be omitted or replaced by another block having similar or identical functions. The blocks of FIG. 5 may be configured with a combination of some of or all the blocks, if necessary.

Figure 6:
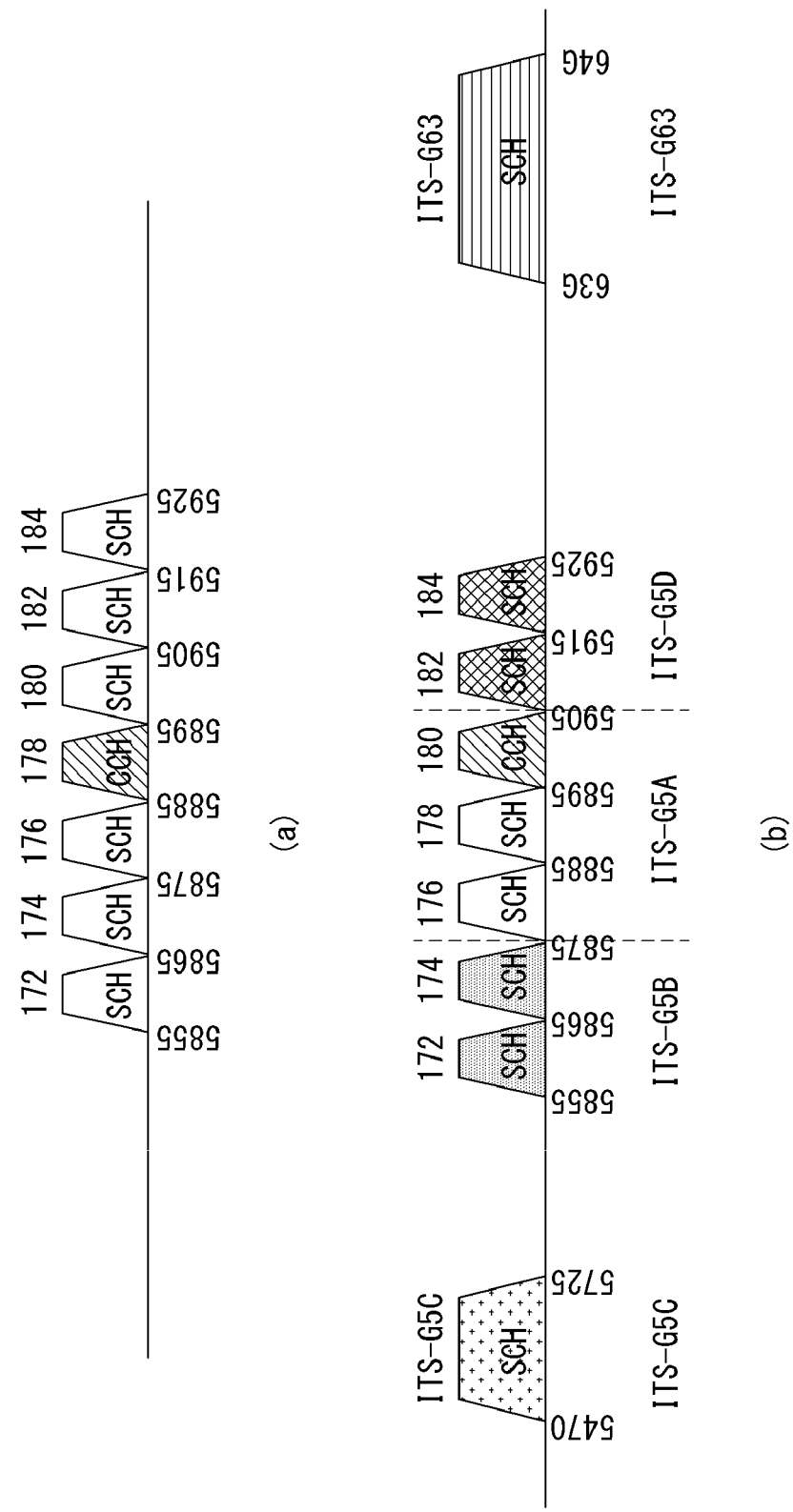
FIG. 6 illustrates multi-channel allocation used for an ITS system operation according to an embodiment of the present invention.

FIG. 6 illustrates multi-channel allocation used for an ITS system operation according to an embodiment of the present invention.

FIG. 6(a) illustrates US spectrum allocation for an ITS, and FIG. 6(b) illustrates EP spectrum allocation for an ITS.

As shown in FIG. 6, the United States and Europe have seven frequencies (each frequency bandwidth: 10 MHz) in 5.9 GHz band (5.855 to 5.925 GHz). Seven frequencies may include one CCH and 6 SCHs. As shown in FIG. 6(a), in the United States, the CCH is allocated to a channel number 178 and as shown in FIG. 6(b), in European, the CCH is allocated to a channel number 180.

In Europe, in order to provide a service that is time-sensitive and having a large data capacity, it is considered to additionally use an ITS-G63 band in a superordinate frequency band based on 5.9 GHz and it is considered to use an ITS-G5 band in a subordinate frequency band. In order to provide a high quality of service by appropriately allocating the service to various multi-channels in such an environment, development of an efficient multi-channel operation method is required.

The CCH indicates a radio channel used for exchange of a management frame and/or a WAVE message. The WAVE message may be a WAVE short message (WSM). The SCH is a radio channel used for providing a service and represents a random channel instead of the CCH. In an embodiment, the CCH may be used for communication of a Wave Short Message Protocol (WSMP) message or communication of a system management message such as a WAVE Service Advertisement (WSA). The SCH may be used for general-purpose application data communication, and communication of such general-purpose application data may be coordinated by service related information such as the WSA.

Hereinafter, the WSA may be also referred to as service advertisement information. The WSA is an application may provide information including announcement of availability of an application-service. A WSA message may identify and describe an application service and a channel in which the service is accessible. In an embodiment, the WSA may include a header, service information, channel information, and WAVE routing advertisement information.

Service advertisement information for service access may be a periodic message. In an embodiment, Co-operative Awareness Messages (CAM) may be periodic messages. The CAM may be broadcasted periodically by a facilities layer. In an embodiment, the CAM may also be transmitted by the RSU, and in such a case, the CAM may be transmitted and received in an RSU interval hereinafter.

Decentralized Environmental Notification Messages (DENM) may be event messages. The event message may be triggered by detection of the event to be transmitted. Service messages may be transmitted to manage a session. In the following embodiments, the event message may include a security message/information. The service message may include a non-safety message/information.

Figure 7:
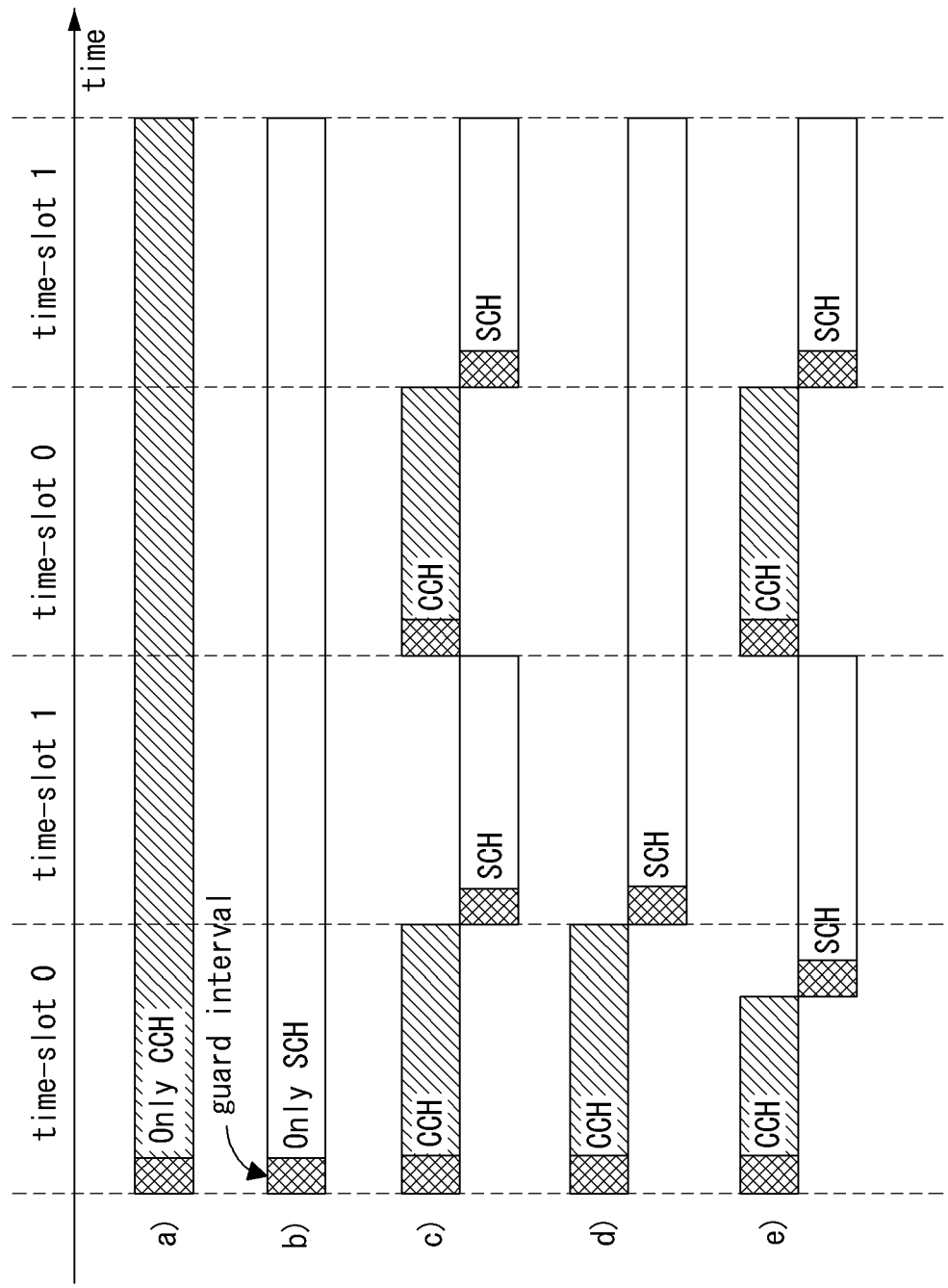
FIG. 7 illustrates a channel coordination mode of a multi-channel operation according to an embodiment of the present invention.

FIG. 7 shows a channel coordination mode of a multi-channel operation according to an embodiment of the present invention.

FIG. 7 shows (a) a continuous mode, (b) an altering mode, (c) an extended mode, and (d) an immediate mode, that is, channel coordination modes of a multi-channel operation. The channel coordination mode may indicate a method that a V2X device accesses a CCH and an SCH.

A V2X device may access at least one channel. In an embodiment, a single-radio device may monitor a CCH and exchange data via an SCH. For this purpose, a channel interval needs to be specified. FIG. 7 shows such a channel interval, that is, time slot allocation. Radio channel altering may be performed based on a synchronized interval in association with a common time base. The sync interval may include a plurality of time slots. Furthermore, the plurality of time slots may correspond to a CCH interval and an SCH interval. In such a case, the sync interval may include a CCH interval and an SCH interval. Traffic may be exchanged in a CCH during the CCH interval. A single-radio device participating in application-service may switch to an SCH during an SCH interval. Each of the CCH interval and the SCH interval may include a guard interval. Each interval may start with a guard interval.

In an embodiment, the exchange of multi-channel operation information and safety-related services information may be performed in a CCH during a CCH interval. Furthermore, negotiation for information exchange between a service provider and a user may be performed in a CCH during a CCH interval. A hardware timing operation for the channel altering of a V2X device may be initiated by a sync signal obtained through universal time coordinated (UTC) estimation. A channel sync may be performed every 1 pulse per second (PPS) section based on UTC.

In an embodiment, FIG. 7 is a channel coordination method of a multi-channel operation (MCO) described in IEEE 1609.4, and shows a method in which in a single physical layer, two MAC layers divide time and alternately use a CCH and different channel modes.

(a)&(b) continuous mode: the continuous mode is a mode in which each vehicle or all vehicles operate regardless of a time division basis, such as the time slot/CCH interval/SCH interval of FIG. 6. In the continuous mode, a V2X device may continuously receive operation information and safety-related services information of a multi-channel in a designated CCH or SCH, or an information exchange may be performed between a service provider and a user.

(c) altering mode: in the altering mode, each vehicle or all vehicles may receive operation information and safety-related services/information of a multi-channel during a CCH interval or may perform a negotiation process for an information exchange between a service provider/user. In the altering mode, each vehicle or all vehicles perform a service/information exchange between a service provider and a user during an SCH interval. In the altering mode, V2X devices may alternately perform communication through a CCH and an SCH during a configured CCH interval and SCH interval.

(d) extended mode: in the extended mode, communication during a CCH interval and an SCH interval may be performed as in the altering mode. However, a service/information exchange during an SCH interval may also be performed in a CCH interval. In an embodiment, a V2X device in the extended mode may transmit and receive control information during a CCH interval, and may maintain an SCH interval until the exchange of service/information is terminated when it enters the SCH interval.

(e) immediate mode: in the immediate mode, the communication of a V2X device may be performed as in the altering mode and/or the extended mode. However, a V2X device in the immediate mode may immediate change a channel to a designated SCH without waiting for the end of a CCH interval when negotiation for an information exchange is completed during the CCH interval, and may initiate an information exchange. As shown in FIG. 7, the extended mode and the immediate mode may be used together.

In the case of the channel coordination modes shown in FIG. 7, management information of a multi-channel and information exchange and negotiation for service provision may be performed only in a CCH during a CCH interval. Negotiation for receiving safety-related services and information or for an information exchange between a service provider and a user may also be performed only in a CCH during a CCH interval.

A guard interval may be included between a CCH interval and an SCH interval. The guard interval may enable a communication device to secure the time necessary for sync upon performing frequency altering and channel altering. Upon channel altering, a hardware timer operation may be started by a sync signal obtained through universal time coordinated (UTC) estimation. A channel sync may be synchronized every 1 pulse per second (PPS) section using UTC as a reference signal.

In an embodiment, a sync interval may include a CCH interval and an SCH interval. That is, one sync interval may include two time slots. The CCH interval and the SCH interval may correspond to a time slot 0 and a time slot 1, respectively. The start of a sync interval may be identical with the start of a common time reference second. A sync interval that is a positive number times may be included for 1 second.

Hereinafter, an enhanced mode, that is, a new channel coordination mode for an efficient multi-channel operation, is proposed and described.

Figure 8:
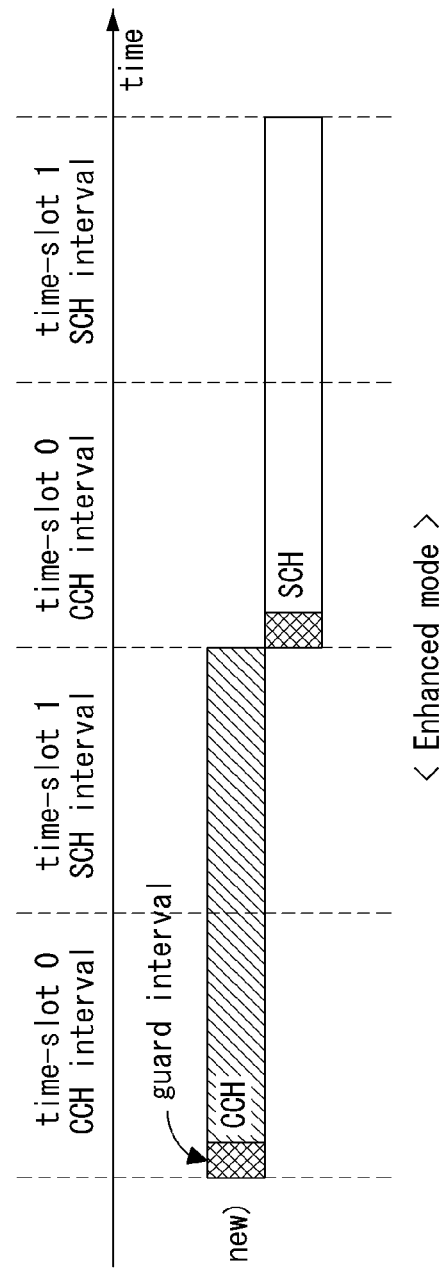
FIG. 8 shows an enhanced mode, that is, a channel coordination mode for a multi-channel operation according to an embodiment of the present invention.

FIG. 8 shows an enhanced mode, that is, a channel coordination mode for a multi-channel operation according to an embodiment of the present invention.

FIG. 8 shows a channel coordination mode proposed in the present invention. In this specification, the proposed channel coordination mode is called an enhanced mode. In the enhanced mode, a V2X communication device may exchange control signals via a CCH in an SCH interval in addition to a CCH interval. That is, the V2X communication device may perform CCH access/communication and SCH access/communication in a sync interval unit.

In an embodiment, operation information and safety-related services of a multi-channel may be transmitted and received via a CCH during a CCH interval as in the modes of IEEE 1609.4. In addition, in the enhanced mode, related information and service may be transmitted and received via the CCH during an SCH interval. A control signal exchange for an information exchange between a service provider and a user may also be transmitted and received via a CCH during a CCH interval as in the modes of IEEE 1609.4. In addition, in the enhanced mode, the control signal exchange may also be transmitted and received via the CCH during an SCH interval.

A control signal includes operation information and safety-related services information of a multi-channel. Furthermore, a control signal includes a signal for an information exchange between a service provider and a user. In an embodiment, a control signal may include a service advertising message (SAM) transmitted by a provider and an ACK message on the receiver side corresponding to the SAM. Furthermore, a control signal may include a WAVE service advertising message (WSAM) provided by a provider and an ACK message on the receiver side corresponding to the WSAM. Furthermore, a control signal may include a Request-To-Send (RTS) signal and Clear-To-Send (CTS) signal for a negotiation between nodes. The nodes may correspond to terminals or vehicles.

In the case of the enhanced mode, both a first time slot and a second time slot included in a sync interval may be used as a CCH interval, and at least one time slot included in a subsequent sync interval may be used as an SCH interval. That is, in the case of the enhanced mode, both the first time slot and second time slot of a sync interval may be referred to as a CCH interval.

In the enhanced mode, a control signal exchange that was permitted only in the CCH interval of a CCH is also permitted in an SCH interval, thereby being capable of improving the flexibility of a channel coordination mode operation. Particularly, there is an advantage in that a vehicle safety-related service provision section can be operated longer compared to the existing mode operation. A detailed operation method and embodiment for the enhanced mode are additionally described below.

Figure 9:
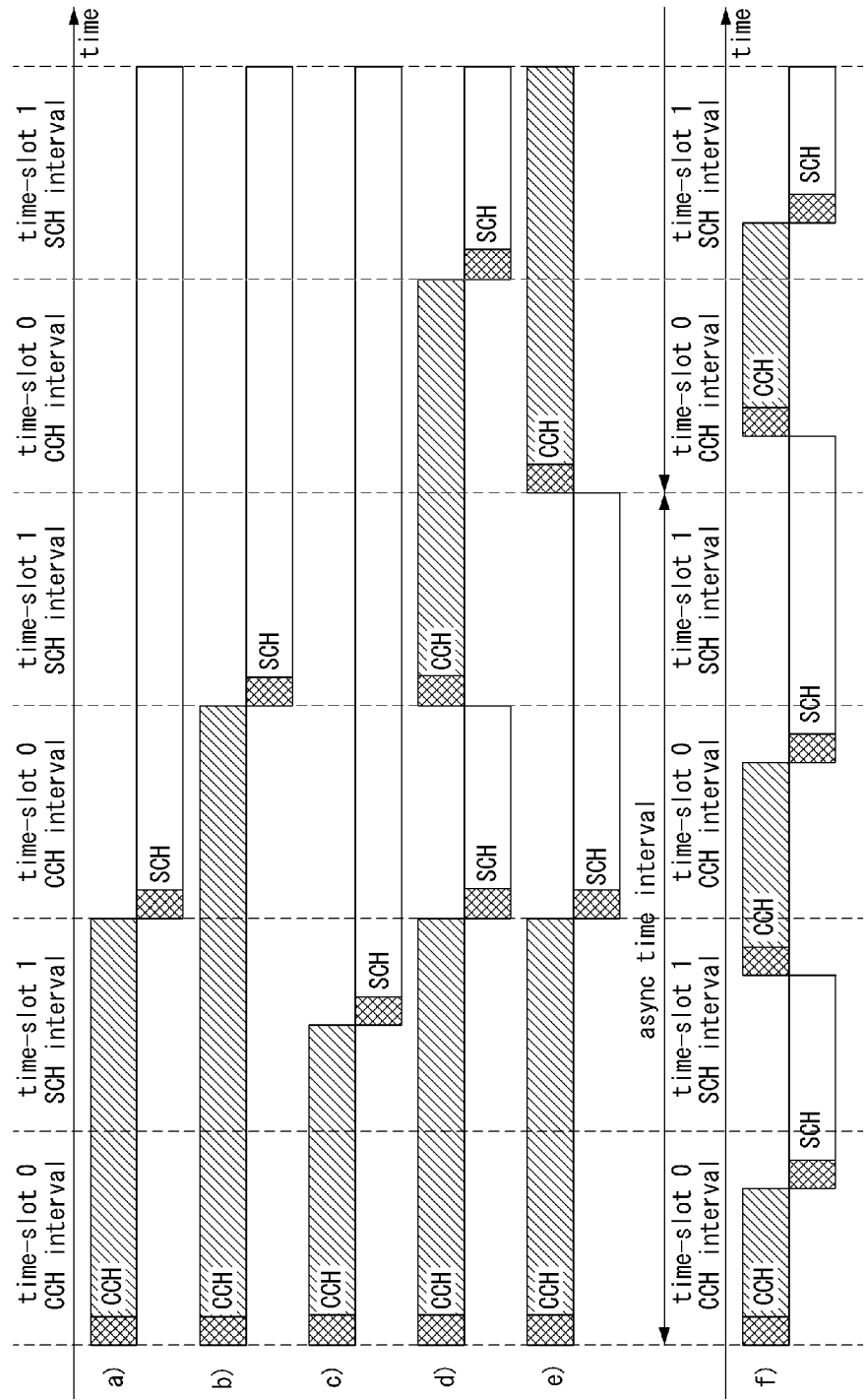
FIG. 9 shows a channel coordination mode of a channel operation method based on the enhanced mode according to an embodiment of the present invention.

FIG. 9 shows a channel coordination mode of a channel operation method based on the enhanced mode according to an embodiment of the present invention.

In the embodiment of FIG. 9(*a*), a V2X device may transmit and receive safety-related services or control signals via a CCH during a CCH interval and an SCH interval. Furthermore, the V2X device may move to a designated SCH in a next interval, and may perform an information exchange between a service provider and a user. In this case, the safety-related services provision via the CCH in the CCH interval and the SCH interval and the control signal exchange for an information exchange between the service provider and the user may be managed using the following method.

If there are service needs or request regardless of a CCH interval/SCH interval, a V2X device may move to a CCH and transmit and receive safety-related services or control signals. Alternatively, the V2X device may separately perform communication in the CCH interval and the SCH interval and. That is, the V2X device may perform communication for safety-related services in the CCH interval, and may perform communication for a control signal exchange for service provision in the SCH interval. Furthermore, the V2X device separately performs communication in the CCH interval and the SCH interval, but may perform communication regardless of the interval with respect to emergency services.

In the embodiment of FIG. 9(*b*), a basic operation of a communication mode is the same as the embodiment of FIG. 9(*a*). However, in the embodiment of FIG. 9(*b*), service transmission and reception may be performed via an SCH in an SCH interval. That is, a service information exchange between a service provider and a user may be started in the SCH interval. If vehicle safety-related services provision and reception are important, although a control signal exchange has been completed in a previous SCH interval, a service information exchange may be started in an SCH interval after a CCH interval.

In the embodiment of FIG. 9(*c*), a basic operation of a communication mode is the same as the embodiments of FIGS. 9(*a*) and 9(*b*). However, in the embodiment of FIG. 9(*c*), when a control signal exchange is completed, a V2X device may start service information transmission and reception by directly accessing a designated SCH channel without waiting for the end of a corresponding interval, as in the embodiments of FIGS. 9(*a*) and 9(*b*).

In the embodiments of FIGS. 9(*d*) and 9(*e*), a V2X device may exchange safety-related services or control signals via a CCH during a CCH interval and an SCH interval, and may transmit and receive services by accessing a designated SCH during a next predetermined interval (e.g., SCH interval or CCH interval+SCH interval). The embodiments of FIGS. 9(*d*) and 9(*e*) include alternately accessing an SCH and a CCH based on a predetermined interval, and area similar to the altering mode of FIG. 7(*c*).

The embodiment of FIG. 9(*f*) shows an asynchronous multi-channel operation method based on the enhanced mode. In the embodiment of FIG. 9(*f*), a V2X device may perform communication by accessing a CCH/SCH regardless of a CCH interval/SCH interval during an async time interval configured as an asynchronous multi-channel mode. In the embodiment of FIG. 9(*f*), a V2X device can access a required channel without taking into consideration a time-slot boundary, and thus has the highest degree of freedom in a multi-channel operation among the embodiments of FIG. 9.

In the embodiment of FIG. 9(f), a V2X device may transmit and receive multi-channel operation information/safety-related services by accessing a CCH regardless of a CCH interval/SCH interval. Furthermore, when a control signal exchange for a service information exchange between a service provider and a user is completed, the V2X device may start the service information exchange by directly accessing a designated SCH. An async time interval may be configured to operate based on a common reference time. The async time interval may be set as a specific value or may be used without constraint (indefinitely). The async time interval may be pre-set as a specific value indicating that a specific time value or period has not been determined.

Hereinafter, the enhanced mode is additionally described. Particularly, three operation methods of the enhanced mode are additionally described below.

In the enhanced mode, when a service/signal, such as a service advertisement message (SAM), a control signal, a WAVE service advertisement message (WSAM), or RTS/CTS, is not present, a V2X device may wait for the reception of multi-channel operation information or service information while always staying in a CCH. The exchange of control signals may be performed via the CCH during at least one interval of a CCH interval or an SCH interval.

(1) First Operating Method of Enhanced Mode

In an embodiment, multi-channel operation information and safety-related services/information may be transmitted and received via a CCH during a CCH interval. Signals/services other than safety, such as control signals for service provision, may be transmitted and received via a CCH during an SCH interval. However, in an embodiment, multi-channel operation information and safety-related services/information may be transmitted and received via a CCH during an SCH interval.

The first method can improve forwarding reliability of safety-related services because safety-related services/message/information communication and control signal communication for service provision are performed in different intervals. Furthermore, compared to other modes in which safety-related services/message/information communication is permitted only in a CCH interval, a longer time interval for safety-related services communication may be provided. Furthermore, more smooth safety-related services and control signal communication can be guaranteed because communication contention between safety-related services and control signals within a CCH interval can be avoided.

(2) Second Operating Method of Enhanced Mode

In an embodiment, multi-channel operation information and safety-related services/information may be transmitted and received via a CCH during a CCH interval. Signals/services other than safety, such as control signals for service provision, may be transmitted and received via a CCH during an SCH interval. That is, a basic operating method is similar to (1) the first operating method of the enhanced mode. However, emergency safety services may be exceptionally transmitted and received via a CCH during an SCH interval.

The second method can improve reliability of safety service provision between vehicles by allowing emergency/urgent safety-related services in an SCH interval.

(3) Third Operating Method of Enhanced Mode

Safety-related services/messages and control signals may be transmitted and received via a CCH regardless of a CCH/SCH interval based on an asynchronous multi-channel operation. For example, multi-channel operation information and safety-related services/information may be transmitted and received even during an SCH interval in addition to a CCH interval. Furthermore, non-safety service/signals, such as control signals, may be transmitted and received via a CCH even during a CCH interval in addition to an SCH interval. Accordingly, channel use efficiency and time use efficiency in a multi-channel operation can be improved.

When a SAM (or control signal or WSAM or RTS) is received, a V2X device may switch to an advertised channel during a given time and may return back to a CCH. An operation of one cycle between the CCH and an SCH may be randomly performed without a time-boundary constraint. An SCH access time may be based on the length of a provided service, and may be indicated by a control signal.

In the above-described embodiments, the enhanced mode may operate without a time constraint in a communication operation. In the start stage, such as the turn-on or switching of a V2X device, the V2X device may be synchronized based on a common time base or time estimation procedure. The length of a sync interval, including at least one of a CCH interval and an SCH interval, may vary every sync interval. The start of the sync interval may be aligned with the start of a common time reference second. The CCH interval may be different from the SCH interval. The CCH interval and the SCH interval may be adaptively configured to reduce traffic congestion. In an embodiment, an integer number of sync interval may be included within one second.

Figure 10:
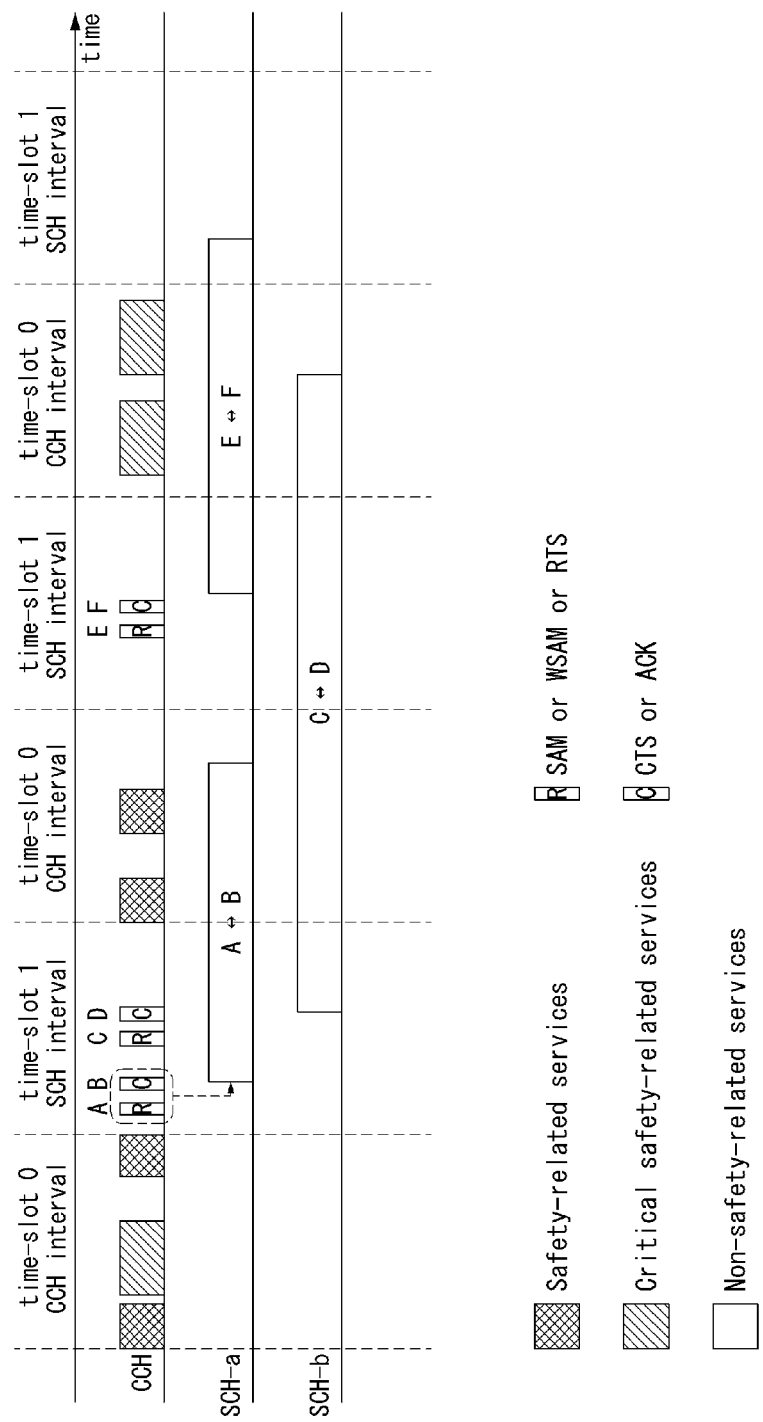
FIG. 10 shows a channel operation method based on the enhanced mode according to an embodiment of the present invention.

FIG. 10 shows a channel operation method based on the enhanced mode according to an embodiment of the present invention.

FIG. 10 shows an operation scenario based on the above-described first operating method of the enhanced mode.

As in FIG. 10, safety-related services and critical safety-related services may be transmitted and received via a CCH during a CCH interval. The safety-related services may be periodic safety-related services. Furthermore, control signals for service provision may be transmitted and received via a CCH during an SCH interval.

The number of control signals allowable in a CCH during an SCH interval may be determined based on the number of SCH channels. A maximum number of channels allowable in each SCH interval may be the number of channels that are idle in an SCH interval window. If all the number of SCH channels or control signals according to idle channels are reserved during an SCH interval, a control signal exchange may be no longer performed. Alternatively, a control signal on which communication has been completed may be invalidated.

In the embodiment of FIG. 10, when a control signal exchange via a CCH during an SCH interval is completed, a V2X device may perform an information exchange by immediately accessing a designated SCH. For example, a vehicle A and a vehicle B may complete a control signal exchange in an SCH interval, and may exchange service information by immediately accessing an SCH-a channel. Furthermore, a vehicle C and a vehicle D may complete a control signal exchange after the control signal exchange of the vehicle A and the vehicle B in then SCH interval, and may exchange service information by immediately accessing an SCH-b channel.

When a service information exchange between vehicles is completed in each SCH, a user-side V2X device may transmit an ACK signal indicating that service has been completed. Alternatively, in order to prevent information exchange congestion, ACK signal transmission may be omitted.

Figure 11:
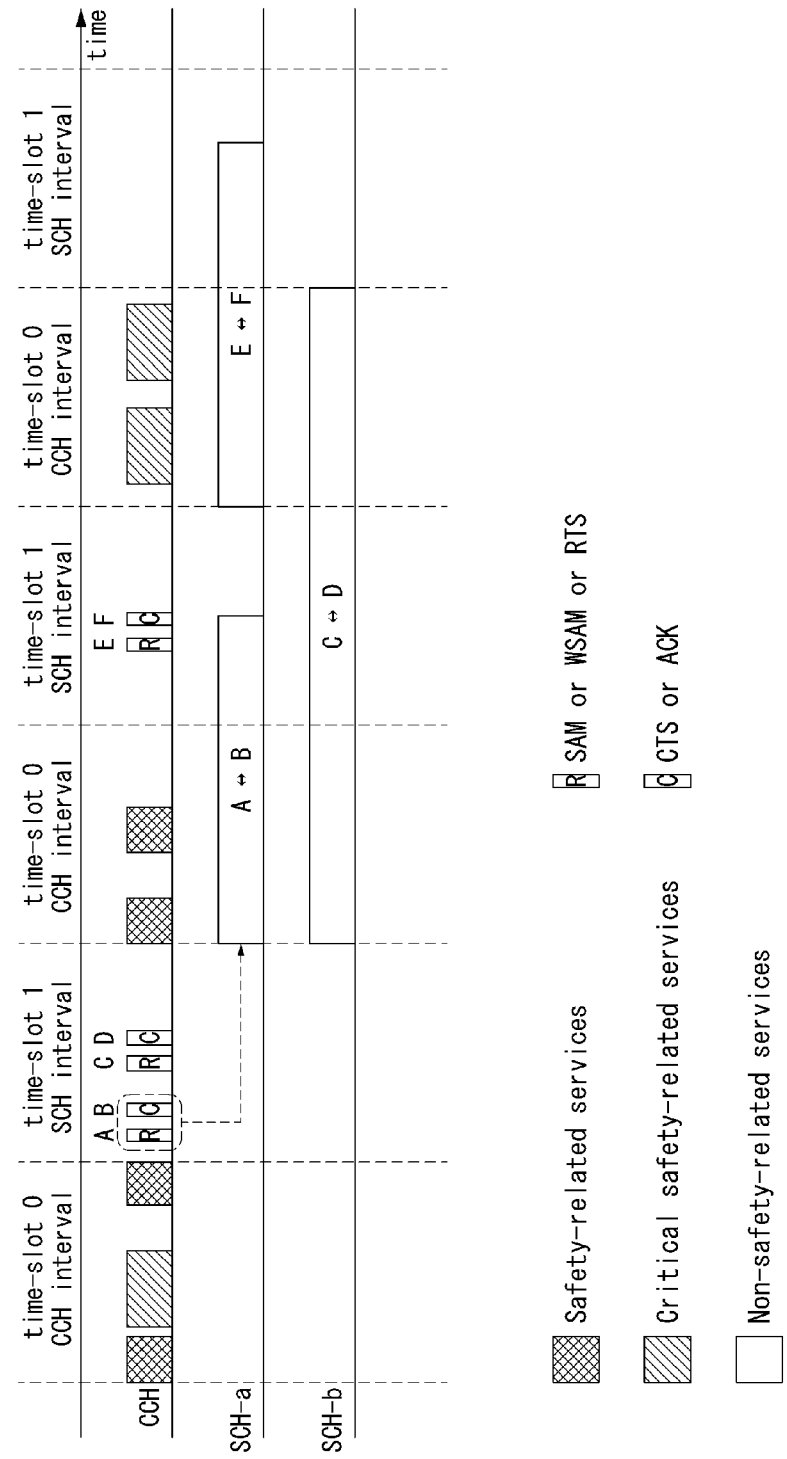
FIG. 11 shows a channel operation method based on the enhanced mode according to an embodiment of the present invention.

FIG. 11 shows a channel operation method based on the enhanced mode according to an embodiment of the present invention.

FIG. 11 shows a different operation scenario based on the above-described first operating method of the enhanced mode. In FIG. 11, description redundant with the description of FIG. 10 is omitted, but the omitted description may also be applied to FIG. 11.

In the embodiment of FIG. 11, a V2X device may access a designated SCH when a SCH interval is completed, without immediately accessing the corresponding designated SCH when a control signal exchange via a CCH is completed during the SCH interval. For example, a vehicle A and a vehicle B may complete a control signal exchange in an SCH interval, and may exchange service information by accessing an SCH-a channel in a CCH interval, that is, a next interval, after the corresponding SCH interval is terminated. The vehicle A and the vehicle B may monitor the control signal exchange of a vehicle C and a vehicle D.

In this case, accurate multi-channel use information can be obtained by monitoring the control signal exchange between different vehicles. However, resource utilization efficiency may be degraded because timing in which an information exchange between vehicles is started is delayed due to a movement to an SCH.

Figure 12:
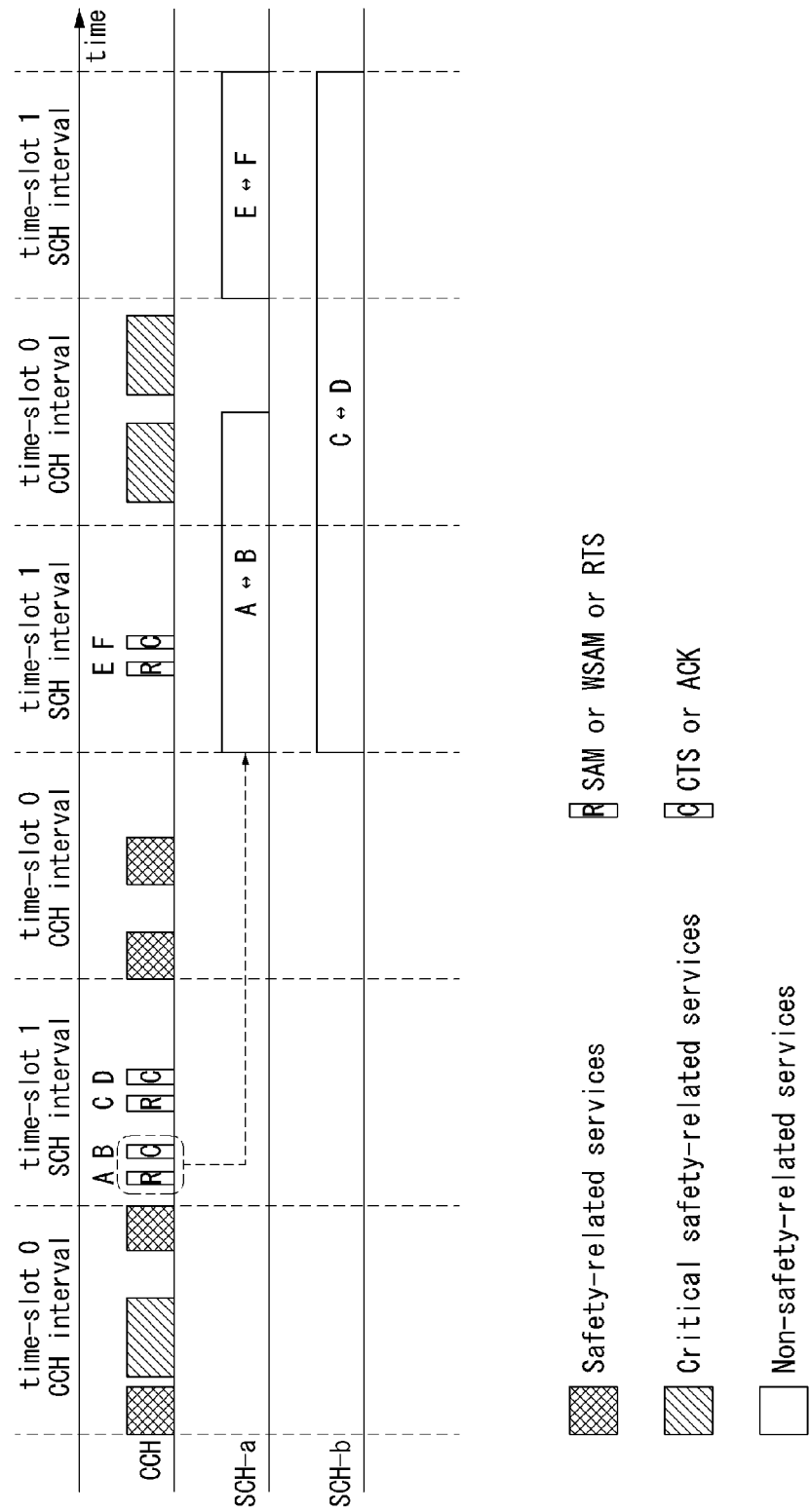
FIG. 12 shows a channel operation method based on the enhanced mode according to an embodiment of the present invention.

FIG. 12 shows a channel operation method based on the enhanced mode according to an embodiment of the present invention.

FIG. 12 shows a different operation scenario based on the above-described first operating method of the enhanced mode. In FIG. 12, description redundant with the description of FIG. 10 is omitted, the omitted description may also be applied to FIG. 12.

In the embodiment of FIG. 12, a V2X device may access a designated SCH in a next SCH interval after an SCH interval is completed, without immediately accessing the designated SCH when a control signal exchange via a CCH is completed during the corresponding SCH interval. For example, a vehicle A and a vehicle B may complete a control signal exchange in an SCH interval, and may exchange service information by accessing an SCH-a channel in the SCH interval, that is, a next interval of a subsequent CCH interval after the corresponding SCH interval is terminated. The vehicle A and the vehicle B may monitor the control signal exchange of a vehicle C and a vehicle D.

In this case, accurate multi-channel use information can be obtained by monitoring the control signal exchange between different vehicles. Furthermore, forwarding reliability of safety services through a CCH channel can be improved by monitoring a next CCH channel. However, resource utilization efficiency may be degraded because timing in which an information exchange between vehicles is started is delayed due to a movement to an SCH.

Figure 13:
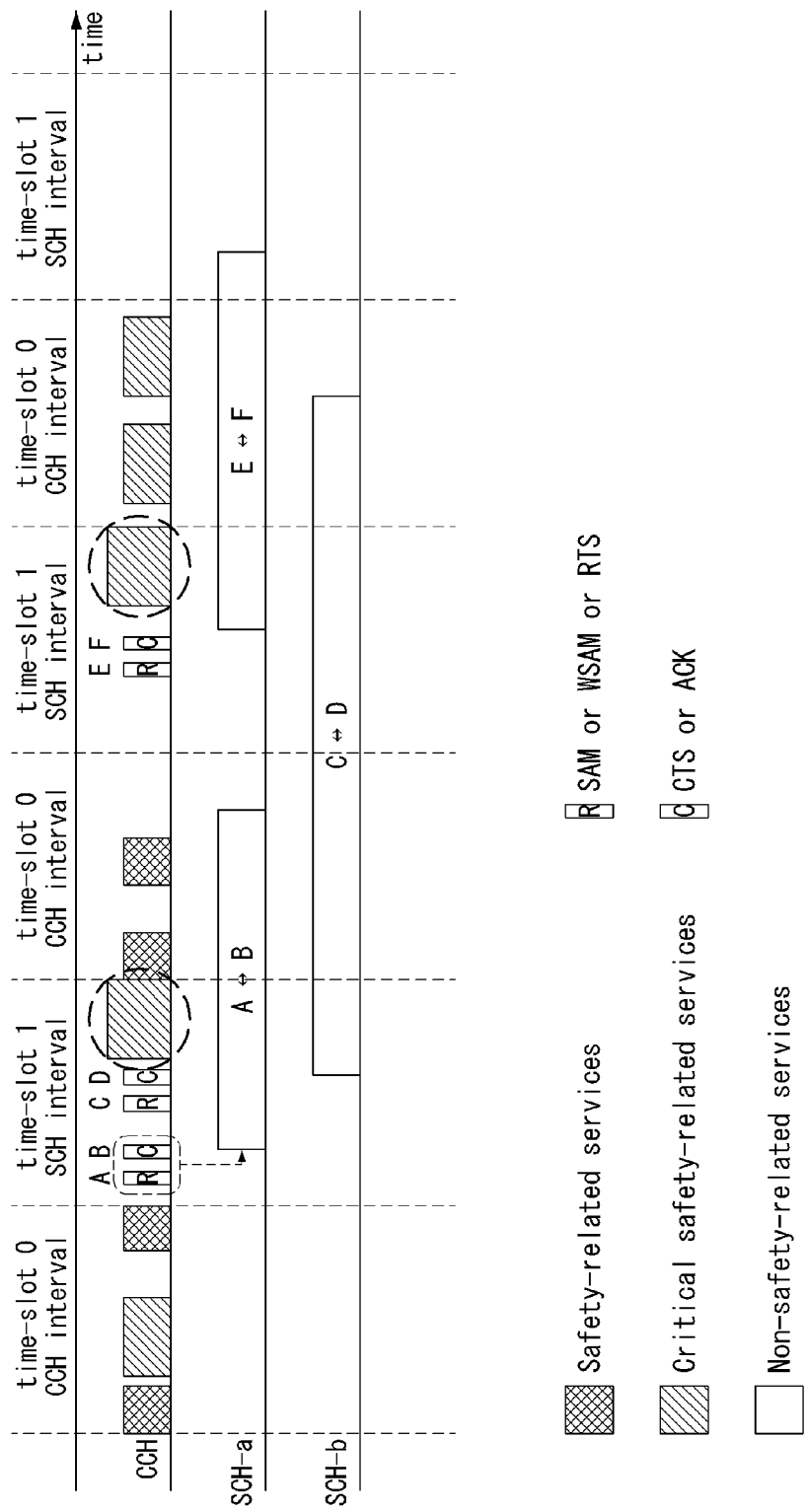
FIG. 13 shows a channel operation method based on the enhanced mode according to an embodiment of the present invention.

FIG. 13 shows a channel operation method based on the enhanced mode according to an embodiment of the present invention.

FIG. 13 shows a different operation scenario based on the above-described second operating method of the enhanced mode. In FIG. 13, description redundant with the description of FIG. 10 is omitted, the omitted description may also be applied to FIG. 13.

In the embodiment of FIG. 13, a V2X device may perform an information exchange by immediately accessing a designated SCH when a control signal exchange via a CCH is completed during an SCH interval. For example, a vehicle A and a vehicle B may complete a control signal exchange in an SCH interval, and may exchange service information by immediately accessing an SCH-a channel. Furthermore, a vehicle C and a vehicle D may complete a control signal exchange after the control signal exchange of the vehicle A and vehicle B in the SCH interval, and may exchange service information by immediately accessing an SCH-b channel.

However, in the embodiment of FIG. 13, emergency safety services, that is, critical safety-related services, may also be provided in an SCH interval in addition to a CCH interval. The embodiment of FIG. 13 may also be applied to the embodiments of FIGS. 11 and 12.

Figure 14:
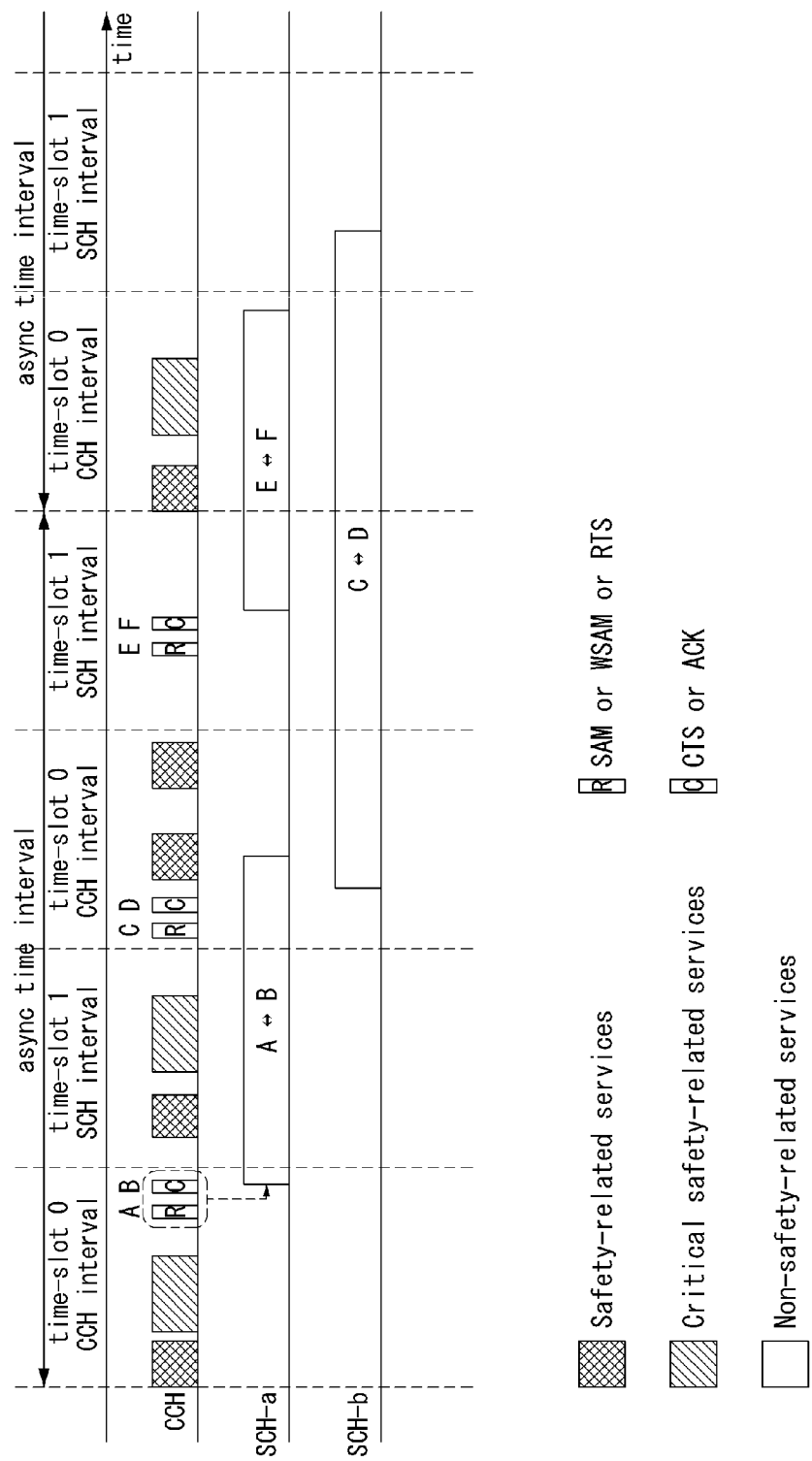
FIG. 14 shows a channel operation method based on the enhanced mode according to an embodiment of the present invention.

FIG. 14 shows a channel operation method based on the enhanced mode according to an embodiment of the present invention.

FIG. 14 shows an operation scenario based on the above-described third operating method of the enhanced mode. In FIG. 14, description redundant with the description of FIG. 10 is omitted, the omitted description may also be applied to FIG. 14.

The embodiment of FIG. 14 shows an embodiment in which an async time interval has been configured as a given period. That is, in FIG. 14, an async time interval may include two sync intervals, that is, four time slots. In the async time interval, control signals may be exchanged via a CCH during a CCH interval or an SCH interval. When the control signal exchange is completed, a V2X device may perform a service information exchange by immediately accessing a designated SCH.

In the embodiment of FIG. 14, a V2X device may perform an information exchange by immediately accessing a designated SCH when a control signal exchange via a CCH is completed during a CCH interval. For example, a vehicle A and a vehicle B may complete a control signal exchange in a CCH interval, and may exchange service information by immediately accessing an SCH-a channel. Furthermore, a vehicle C and a vehicle D may complete a control signal exchange in a different CCH interval, and may exchange service information by immediately accessing an SCH-b channel.

The embodiment of FIG. 14 shows that a control signal exchange may be performed in a CCH interval or an SCH interval.

Figure 15:
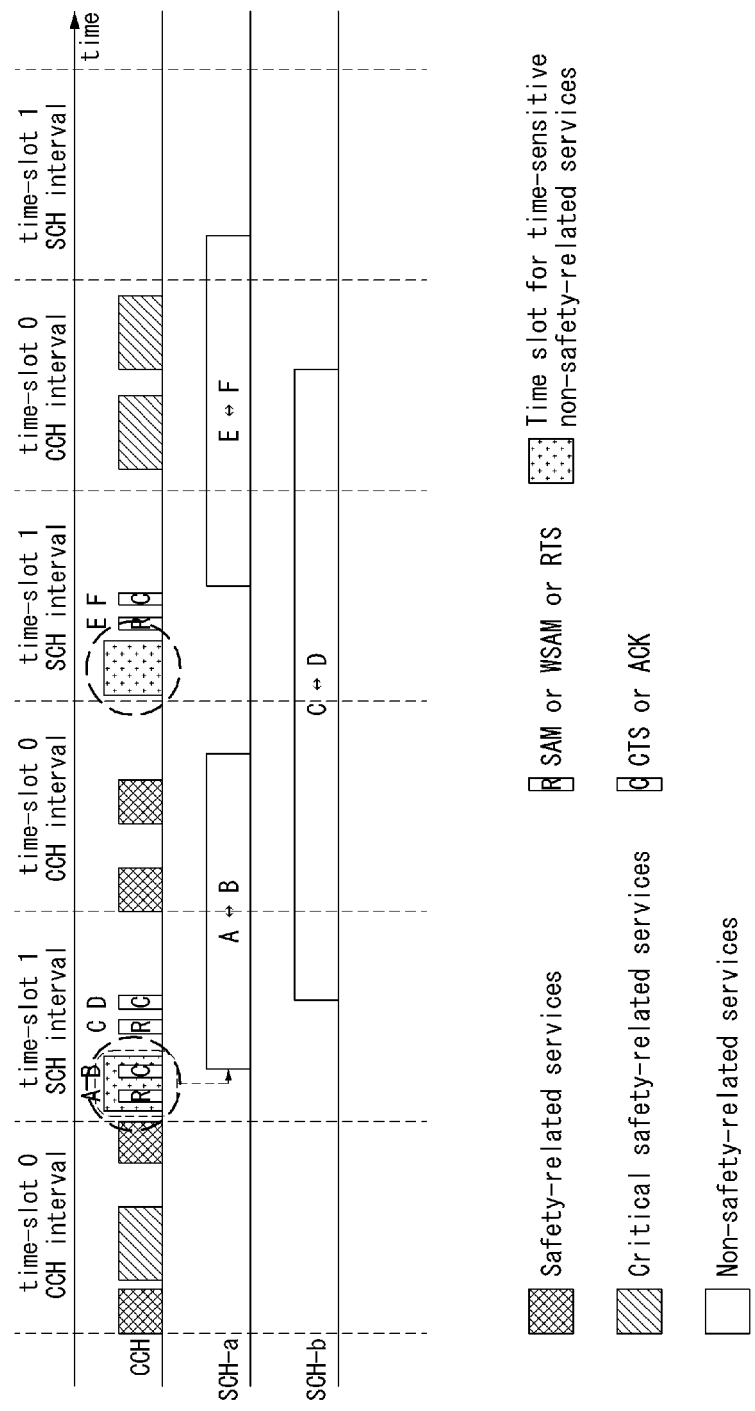
FIG. 15 shows a channel operation method based on the enhanced mode according to an embodiment of the present invention.

FIG. 15 shows a channel operation method based on the enhanced mode according to an embodiment of the present invention.

FIG. 15 shows a different operation scenario based on the above-described first and second operating methods of the enhanced mode. In FIG. 15, description redundant with the description of FIG. 10 is omitted, the omitted description may also be applied to FIG. 15.

In the embodiment of FIG. 15, a V2X device may perform an information exchange by immediately accessing a designated SCH when a control signal exchange via a CCH is completed during an SCH interval. For example, a vehicle A and a vehicle B may complete a control signal exchange in an SCH interval, and may exchange service information by immediately accessing an SCH-a channel. Furthermore, a vehicle C and a vehicle D may complete a control signal exchange after the control signal exchange of the vehicle A and vehicle B in the SCH interval, and may exchange service information by immediately accessing an SCH-b channel.

However, in the embodiment of FIG. 15, time-sensitive non-safety-related services may be provided with the highest priority in an SCH interval. That is, a time slot for time-sensitive not-safety-related services may be allocated to the foremost except a guard period in an SCH interval. That is, a signal/service exchange having high reliability of time-sensitive services may be possible by allocating a time slot dedicated to a specific purpose to an SCH interval. The length of an additional time slot may be variably configured based on the number of permitted control signal exchanges.

The embodiment of FIG. 15 may also be applied to the embodiments of FIGS. 10 to 14.

In another embodiment, a CCH interval or a sync interval may include a safety interval and a non-safety interval. The safety interval and the non-safety interval are described below.

(1) Safety Interval (Or Safety Time Slot)

A safety interval may be allocated for the operation information and safety-related services/information transmission/reception of a multi-channel with a surrounding vehicle or infra facility. In an embodiment, the safety interval may be allocated ahead of a non-safety interval by taking into consideration that it has higher importance than services other than safety. In an embodiment, a safety-related message among event messages may be transmitted and received in a safety interval. A safety-related message among periodic messages may also be transmitted and received in a safety interval.

Time slot operations between safety-related services and other services can improve safety reliability by avoiding contention with a communication signal for non-safety services upon performing safety-related services provision. That is, the delay of safety-related information forwarding can be prevented by avoiding contention between a control signal for an information exchange between a service provider and a user for non-safety services and a control signal for safety-related services.

(2) Non-Safety Interval (Or Non-Safety Time Slot)

A non-safety interval may be allocated for communication between a service provider and a user for non-safety services. That is, a non-safety interval may be provided to exchange control signals for an information exchange between a service provider and a user. A service message among the above-described messages may be transmitted and received in a non-safety interval. A non-safety interval may be allocated to be positioned behind a safety interval by taking into consideration that the non-safety interval has lower importance than safety-related services/information.

The allocation of the above-described time intervals may be previously determined or may be variably configured. Whether a safety interval and a non-safety interval will be included or the length of a safety interval and a non-safety interval may be indicated in a higher layer, such as the application layer. That is, a value related to a safety interval and/or a non-safety interval may be pre-defined/configured from a higher layer, and may be stored in the MAC sublayer management entity extension (MLMEX) of a management plane through the MLMEX service access point (SAP) of the MAC layer. A method of configuring a value related to a safety interval and/or a non-safety interval is described below.

Figure 16:
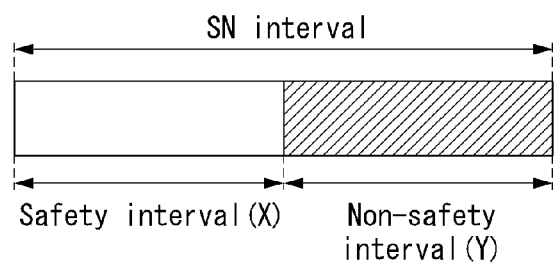
FIG. 16 shows a time interval coordination method according to an embodiment of the present invention.

FIG. 16 shows a time interval coordination method according to an embodiment of the present invention.

In the above-described embodiment, the CCH interval or the sync interval may include a safety interval or a non-safety interval. As in FIG. 16(*a*), a time slot including a safety interval and a non-safety interval may be referred to as an SN interval. The SN interval may be defined as the sum of a safety interval X and a non-safety interval Y. The SN interval may be the same as the subtraction of a guard interval from a sync interval (SN interval=sync_interval−guard_interval). A safety interval and a non-safety interval may be adaptively defined within a sync interval.

The ratio of a safety interval and a non-safety interval may be defined and provided as in an interval table of FIG. 16(*b*).

The interval table may be defined using at least one of bits, usage, a safe interval (ratio), or a non-safety interval (ratio).

A safety interval X and a non-safety interval Y may be calculated as follows using ratios provided in the table of FIG. 16(*b*) and an SN interval.

Safety interval $X = SN\ interval \times (Sr/(Sr+Nr))$

Non-safety interval $Y = SN\ interval \times (Nr/(Sr+Nr))$

Sr indicates the safety interval ratio of FIG. 16(*b*), and Nr indicates the above-described non-safety interval ratio.

The bit values of FIG. 16(*b*) may be referred to as interval information/values. The interval information may indicate whether at least one of safety interval or a non-safety interval is present within a CCH interval and the ratio of each interval. Whether a corresponding interval is present may be indicated using a ratio value of one interval as 0.

In FIG. 16(*b*), when a value of interval information is 0000, a CCH interval may include only a safety interval. When a value of interval information is 0001, a CCH interval may include only a non-safety interval. For example, if an SN interval is 12 μs and a value of interval information is 0011, a safety interval may be 8 μs=12×(⅔), and a non-safety interval may be 4 μs=12×(⅓).

Interval information, such as FIG. 16(*b*), may be signaled. That is, an interval degree of FIG. 16(*b*) may be included in the header of a signal transmitted in a CCH interval. Interval information may be also referred to as time interval information hereinafter.

Figure 17:
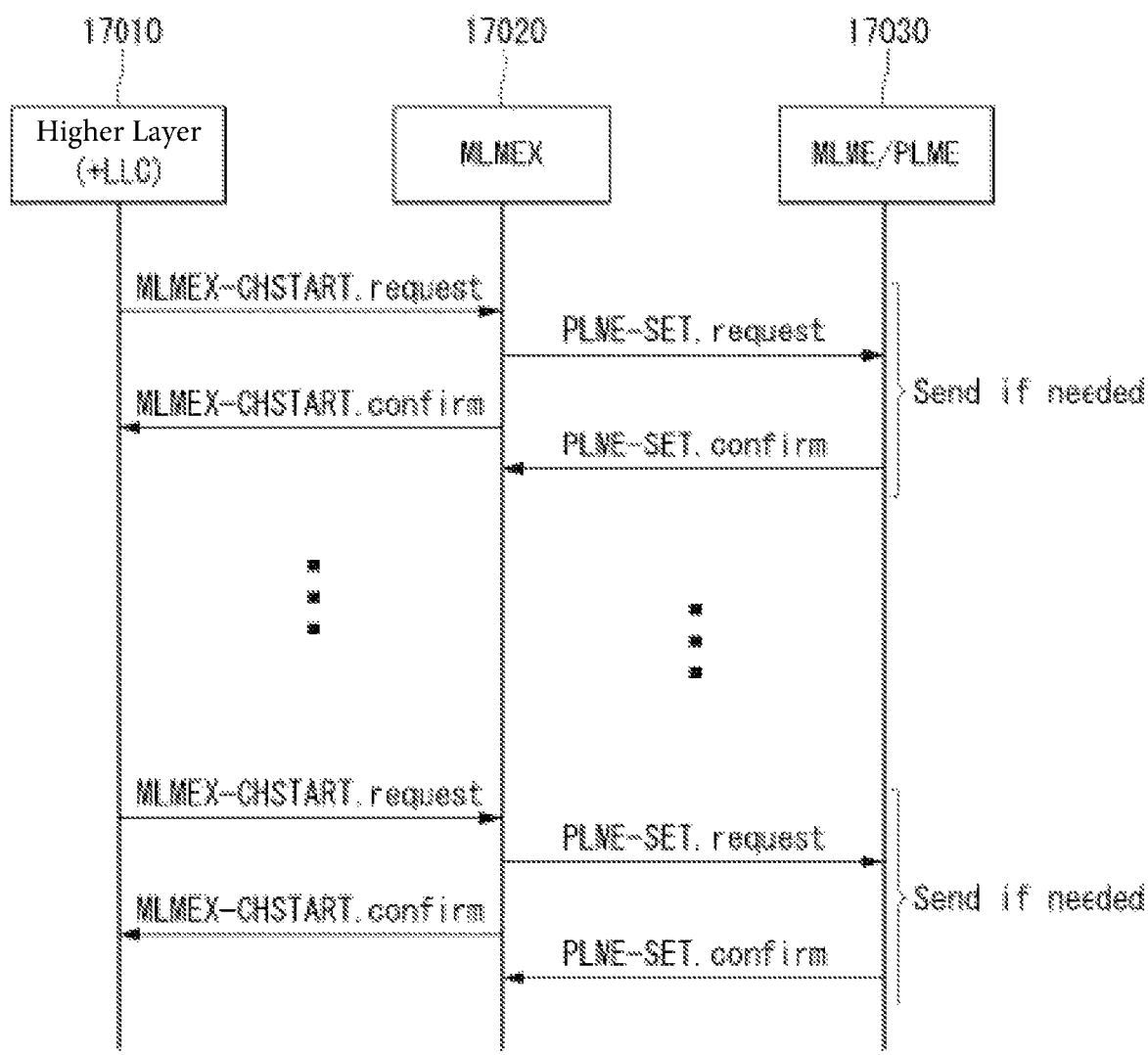
FIG. 17 shows a multi-channel operating method of a V2X device according to an embodiment of the present invention.

FIG. 17 shows a multi-channel operating method of a V2X device according to an embodiment of the present invention.

FIG. 17 is a flowchart showing an operation related to an operation of the above-described enhanced mode, particularly. Similar to that shown in FIG. 2, a V2X transmission device may include a MAC sublayer management entity (MLME), that is, an entity to manage a MAC sublayer, and an MLME extension (MLMEX). Furthermore, the V2X transmission device may include a physical sublayer management entity (PLME) that manages the PHY sublayer.

In an embodiment, the MAC sublayer may provide data services, such as channel coordination, channel routing, and user priority. The MAC sublayer may coordinate data resources, may handle the in/out of higher layer data, or may control user priority. In an embodiment, the MLME may provide services, such as multi-channel synchronization and channel access. In an embodiment, the MLMEX may control an operation of 802.11 MLME. That is, the MLMEX may control an 802.11 MLME in order to perform services/operations described in IEEE 1609.4.

In the enhanced mode, a V2X device may perform communication using the above-described methods during an allocated channel and an allocated time interval. Channel allocation and time interval information necessary for an enhanced mode operation may be forwarded using MLMEX-CHSTART.request information/command. The channel allocation information and time interval information may be signaled through a given method. The MLMEX-CHSTART.request information/command may be referred to as a channel start information/command in this specification.

As in FIG. 17, the channel allocation information and time interval information necessary for an enhanced mode operation may be forwarded from a higher layer to a lower layer using MLMEX-CHSTART.request information. A higher layer 17010 may transmit MLMEX-CHSTART.request information to an MLMEX 17020. The MLMEX

17020 may transmit the received information to an MLME/PLME 17030 as PLME-SET.request information. The MLMEX 17020 may transmit PLME-SET.request to the MLME/PLME 17030 so that current frequency setting to a specific channel number and time interval is performed based on the received MLMEX-CHSTART.request information. The MLME 17030 may not forward the information to a PLME when MLMEX-CHSTART.request is not received.

FIG. 18 shows parameters of MLMEX-CHSTART.request information according to an embodiment of the present invention.

In an embodiment, the MLMEX-CHSTART.request information may include parameters shown in FIG. 18. The MLMEX-CHSTART.request information may include the parameters of FIG. 18 as fields or field values. The parameters of FIG. 18 are described below.

Channel Identifier: The channel to be made available for communications.

Time Slot: The time slot in which alternating access is to be provided.

OperationRateSet: If present, it may be used as specified in IEEE 802.11 standard document.

EDCA Parameter Set: If present, it may be used as specified in IEEE 802.11 standard document.

Immediate Access: In an embodiment, an immediate access parameter is an integer value and may have a value of 0~255. This parameter may indicate the duration of immediate channel access in a sync interval. In an embodiment, the value of 255 may indicate indefinite access. The value of 0 may indicate that there is no request. Furthermore, this parameter may also indicate the duration of immediate channel access in a sync interval if enhanced mode access is available.

Enhanced mode access: In an embodiment, an enhanced mode access parameter is an integer value, and may have a value of 0~2. The parameter may indicate an enhanced mode. The value of the parameter may indicate the above-described operation method of each enhanced mode. For example, when the parameter value is 0, it may indicate the first operating method of the enhanced mode. When the parameter value is 1, it may indicate the second operating method of the enhanced mode. When the parameter value is 2, it may indicate the third operating method of the enhanced mode.

Time interval value: In an embodiment, a time interval value parameter is an integer value, and may have a value of 0~15. In an embodiment, the time interval value parameter may indicate the table of FIG. 16(*b*). However, in order to minimize a signaling burden, the value of the time interval value parameter may be configured more simply. For example, when the value of the time interval value parameter is 0(0000), it may indicate only a safe interval. When the value of the time interval value parameter is 1(0001), it may indicate only a non-safety interval. When the value of the time interval value parameter is 2(0010), it may indicate that safety services and non-safety services coexist (safety interval+non-safety interval). When the value of the time interval value parameter indicates that safety services and non-safety services coexist, the ratio may be configured. For example, the ratio of each of safety services and non-safety services may be 50% (safety (50%)+non-safety (50%)).

Figure 19:
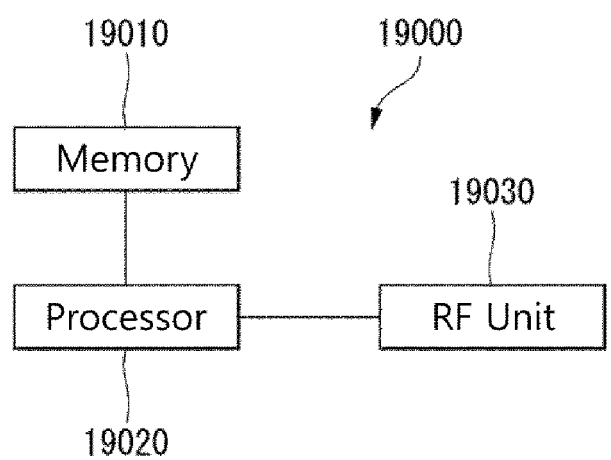
FIG. 19 is a block diagram of a V2X communication device according to an embodiment of the present invention.

FIG. 19 is a block diagram of a V2X communication device according to an embodiment of the present invention.

In FIG. 19, the V2X communication device 19000 may include a memory 19010, a processor 19020, and an RF unit 19030. As described above, the V2X communication device may be an on board unit (OBU) or a road side unit (RSU) or may be included in an OBU or RSU.

The RF unit 20030 is connected to the processor 19020 and may transmit/receive radio signals. The RF unit 20030 may transmit a signal by up-converting data, received from the processor 19020, into a transmission and reception band. The RF unit 19030 may include at least one of the subblocks shown in FIG. 5.

The processor 19020 is connected to the RF unit 19030, and may implement the physical layer and/or MAC layer according to the ITS system or WAVE system. The processor 19020 may be configured to perform the operations according to the above-described various embodiments of the present invention according to the drawings and description. Furthermore, at least one of a module, data, program or software that implements the operations of the V2X communication device 19000 according to the above-described various embodiments of the present invention may be stored in the memory 19010 and executed by the processor 19020.

The memory 20010 is connected to the processor 19020 and stores various pieces of information for driving the processor 19020. The memory 20010 may be included in the processor 19020 or positioned outside the processor 19020 and may be connected to the processor 19020 by well-known means.

A detailed configuration of the V2X communication device 19000 of FIG. 19 may be implemented so that it is independently applied to the various embodiments of the present invention or two or more of the embodiments is applied to the detailed configuration. The above-described entire description of this specification in addition to the description related to FIG. 20 may be applied to a multi-channel operation method of the V2X communication device 19000 shown in FIG. 19.

Figure 20:
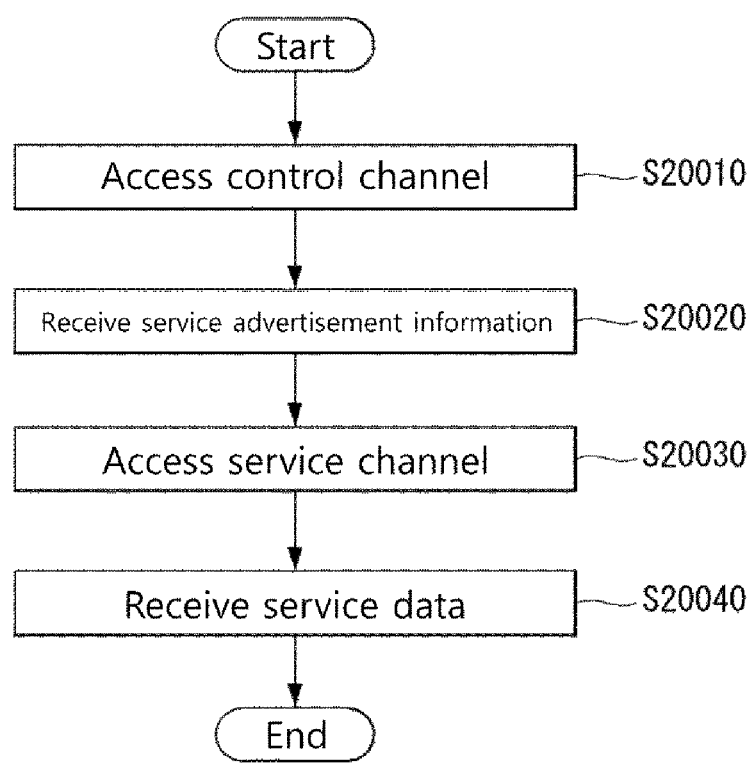
FIG. 20 is a flowchart of a multi-channel operation method of the V2X communication device according to an embodiment of the present invention.

FIG. 20 is a flowchart of a multi-channel operation method of the V2X communication device according to an embodiment of the present invention.

The V2X communication device may access a control channel (S20010). As described above, the control channel is a channel for a system management information or service advertisement information exchange. The V2X communication device may receive the service advertisement information via the accessed control channel (S20020). The service advertisement information may include information necessary to receive provided services.

In an embodiment, the service advertisement information may identify and describe services and a channel through which services are provided. The service advertisement information may also include at least one of a header, service information, channel information or routing advertisement information. Channel information of the service advertisement information may provide information for an SCH that needs to be accessed for service join as a channel number. The service information may identify/describe at least one of attributes, a configuration or availability for provided services.

The V2X communication device may access a service channel (S20030). The V2X communication device may access the service channel based on the received service advertisement information. As described above, the service channel is a channel for the transmission and reception of application data for service provision. The V2X communication device may receive service data via the accessed service channel (S20040). The V2X communication device may join services by accessing an SCH indicated by channel information included in the service advertisement information.

The control channel access and the service channel access may be managed based on the channel coordination mode described in FIGS. 7 to 9. The channel access is performed based on a sync interval. The sync interval may include a first time unit and a second time unit. The first time unit may correspond to a CCH interval for the control channel access. The second time unit may correspond to an SCH interval for the service channel access. Hereinafter, the first time unit and the second time unit may correspond to the time-unit 0 and the time-unit 1 shown in FIGS. 7 to 15, respectively. Furthermore, a third time unit and a fourth time unit may correspond to the time-unit 0 and the time-unit 1 shown in FIGS. 7 to 15, respectively.

As described above, when the channel coordination mode is an enhanced mode, the control channel access may be performed via a control channel during at least one time unit among the first time unit or second time unit of a first sync interval. Furthermore, the service information reception via the control channel of the enhanced mode may be performed via a control channel during at least one time unit among the first time unit or second time unit of the first sync interval.

As described above, when the channel coordination mode is the enhanced mode, the service channel access may be performed via a control channel during at least one time unit among the third time unit or four time unit of a second sync interval. Furthermore, the service data reception via the service channel of the enhanced mode may be performed via the control channel during at least one time unit among the third time unit or fourth time unit of the second sync interval. The second sync interval is a sync interval subsequent to the first sync interval.

The control channel access, the control information reception, the service channel information, and the service data reception may be performed using at least one embodiment among the embodiments described with reference to FIGS. 7 to 15 or a combination of the embodiments.

The first sync interval include at least one of a safety interval communicating safety-related service data or a non-safety interval communicating non-safety-related service data, and related embodiments have been described in relation to FIG. 16.

According to the above-described embodiments, the present invention can provide a flexible multi-channel operation and improve resource use efficiency in V2X communication. Furthermore, the present invention can reduce communication contention and improve transmission reliability by extending a time slot for a control channel exchange. The present invention can improve the flexibility of a communication system operation because the above-described various embodiments can be applied to the extended time slot.

In the above-described embodiments, the V2X communication device may correspond to a user equipment with which services are provided, but the V2X communication device is not limited to the user equipment. The V2X communication device may correspond to a provider device that provides services. If the V2X communication device is a provider, the flowchart of FIG. 20 may be applied as follows.

A V2X communication device may access a CCH and transmit service advertisement information in the CCH. Furthermore, the V2X communication device may access an SCH and transmit service data in the SCH. A V2X communication device as a provider device may always access a plurality of channels and perform communication. That is, in the case of a V2X communication device as a provider, the CCH access and SCH access steps may be omitted. The V2X device may transmit service data in an SCH while transmitting service advertisement information in a CCH.

The above-described embodiments have been achieved by combining the elements and characteristics of the present invention in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the above-described functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative, but should be construed as being illustrative from all aspects. The scope of the present invention should be determined by reasonable analysis of the attached claims, and all changes within the equivalent range of the present invention are included in the scope of the present invention.

Mode for Invention

Those skilled in the art will understand that the present invention may be changed and modified in various ways without departing from the spirit or range of the present invention. Accordingly, the present invention is intended to include all the changes and modifications provided by the appended claims and equivalents thereof.

In this specification, both the device and the method have been described, and the descriptions of both the device and method may be complementarily applied.

Various embodiments have been described in Best Mode for Invention.

INDUSTRIAL APPLICABILITY

The present invention is used in a series of broadcasting signal providing fields.

Those skilled in the art will understand that the present invention may be changed and modified in various ways without departing from the spirit or range of the present invention. Accordingly, the present invention is intended to include all the changes and modifications provided by the appended claims and equivalents thereof.

The invention claimed is:

1. A multi-channel operation method of a V2X communication device, comprising:
   accessing a control channel (CCH) for a service advertisement information exchange;
   receiving the service advertisement information via the accessed control channel;
   accessing a service channel (SCH) for a transmission or reception of service data for service provision based on the service advertisement information; and
   receiving the service data via the service channel,
   wherein the control channel access and the service channel access operate based on a channel coordination mode,
   wherein the control channel access and the service channel access are performed based on a sync interval, and the sync interval comprises a first time unit and a second time unit,
   wherein based on the channel coordination mode being an enhanced mode:
   (i) the control channel access and the service advertisement information reception are performed via the control channel during at least one time unit among a first time unit or second time unit of a first sync interval,
   (ii) the service channel access and the service data reception are performed via the service channel during a second sync interval subsequent to the first sync interval, and
   (iii) the service channel access and the service data reception are performed via the service channel during at least one time unit among a third time unit or fourth time unit of the second sync interval.

2. The method of claim 1,
   wherein the first time unit is a CCH interval for the control channel access, and
   wherein the second time unit is an SCH interval for the service channel access.

3. The method of claim 1,
   wherein the first sync interval comprises at least one of a safety interval communicating safety-related service data or a non-safety interval communicating non-safety-related service data.

4. A V2X communication device, comprising:
   a memory configured to store data;
   an RF unit configured to transmit and receive radio signals; and
   at least one processor configured to perform operations comprising:
   accessing a control channel (CCH) for a service advertisement information exchange;
   receiving the service advertisement information via the accessed control channel;
   accessing a service channel (SCH) for a transmission or reception of service data for service provision based on the service advertisement information; and
   receiving the service data via the service channel,
   wherein the control channel access and the service channel access operate based on a channel coordination mode,
   wherein the control channel access and the service channel access are performed based on a sync interval, and the sync interval comprises a first time unit and a second time unit,
   wherein based on the channel coordination mode being an enhanced mode:
   (i) the control channel access and the service advertisement information reception are performed via the control channel during at least one time unit among a first time unit or second time unit of a first sync interval,
   (ii) the service channel access and the service data reception are performed via the service channel during a second sync interval subsequent to the first sync interval, and
   (iii) the service channel access and the service data reception are performed via the service channel during at least one time unit among a third time unit or fourth time unit of the second sync interval.

5. The V2X communication device of claim 4,
   wherein the first time unit is a CCH interval for the control channel access, and
   wherein the second time unit is an SCH interval for the service channel access.

6. The V2X communication device of claim 4,
   wherein the first sync interval comprises at least one of a safety interval communicating safety-related service data or a non-safety interval communicating non-safety-related service data.

* * * * *